United States Patent [19]
Thompson

[11] Patent Number: 5,158,195
[45] Date of Patent: * Oct. 27, 1992

[54] CLOSURE CAP WITH A SEAL AND METHOD OF AND APPARATUS FOR FORMING SUCH CLOSURE AND SEAL

[75] Inventor: Mortimer S. Thompson, Maumee, Ohio

[73] Assignee: Tri-Tech Systems International, Inc., Maumee, Ohio

[*] Notice: The portion of the term of this patent subsequent to Mar. 14, 2006 has been disclaimed.

[21] Appl. No.: 390,737

[22] Filed: Aug. 8, 1989

Related U.S. Application Data

[60] Division of Ser. No. 61,304, Jun. 10, 1987, Pat. No. 4,872,304, which is a continuation-in-part of Ser. No. 809,057, Dec. 12, 1985, Pat. No. 4,709,824, which is a continuation-in-part of Ser. No. 809,058, Dec. 12, 1985, Pat. No. 4,708,255.

[51] Int. Cl.⁵ .................... A47J 41/02; B65D 53/00
[52] U.S. Cl. .................... 215/344; 215/DIG. 1; 277/1
[58] Field of Search ........... 215/252, 341, 343, 344, 215/270, DIG. 1, 256; 277/1

[56] References Cited

U.S. PATENT DOCUMENTS

| | | | |
|---|---|---|---|
| 2,456,560 | 12/1948 | Keith | 215/DIG. 1 |
| 3,038,624 | 6/1962 | Wieckmann | 215/344 X |
| 3,200,981 | 8/1965 | Harding | 215/DIG. 1 |
| 3,203,571 | 8/1965 | Plunkett | 215/DIG. 1 |
| 3,837,657 | 9/1974 | Farnam et al. | 277/1 |
| 3,974,932 | 8/1976 | Faulstich | 215/256 |
| 4,793,506 | 12/1988 | Thompson | 215/344 |
| 4,811,857 | 3/1989 | Thompson | 215/DIG. 1 |

FOREIGN PATENT DOCUMENTS 788148 12/1957 United Kingdom ......... 215/DIG. 1

Primary Examiner—Stephen Marcus
Attorney, Agent, or Firm—Shea & Gould

[57] ABSTRACT

In combination, a container and a linerless cap and a method of forming the cap. In the method the cap is molded from plastic and includes a top wall, an outer depending skirt and an internal depending substantially annular wall having an upper end integral with and depending from the top wall and a lower free end. Thereafter the free end is engaged by a curling tool to progressively turn the free end away from the internal wall to curve the free end into a curvilinear compressible and resilient free end adapted to be engaged for sealing. The engageable free end of the seal can have a coil, O, U, J or quarter round cross sectional shape and can be a rim, plug or corner seal.

62 Claims, 10 Drawing Sheets

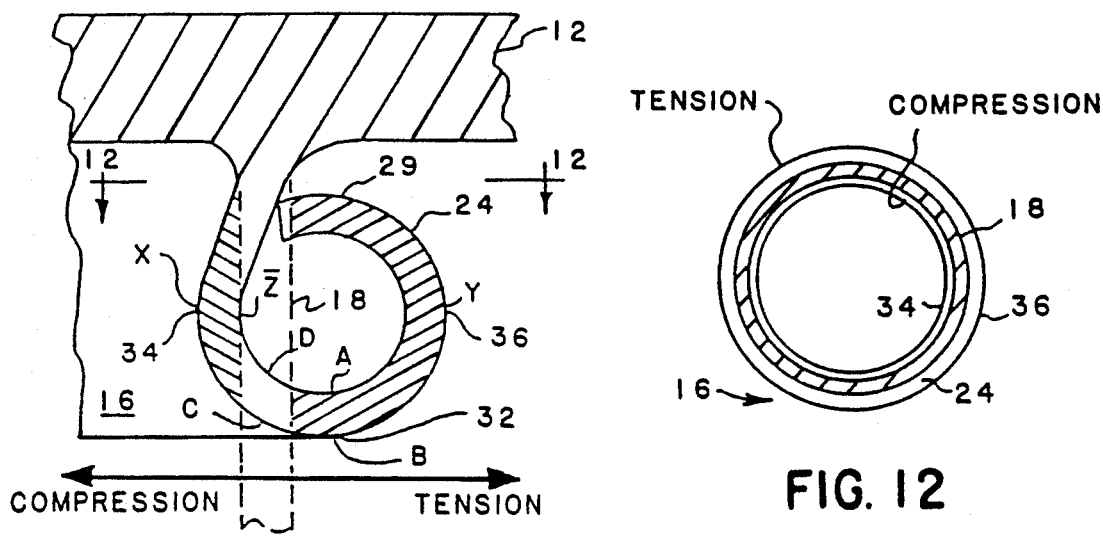
FIG. 11
FIG. 12
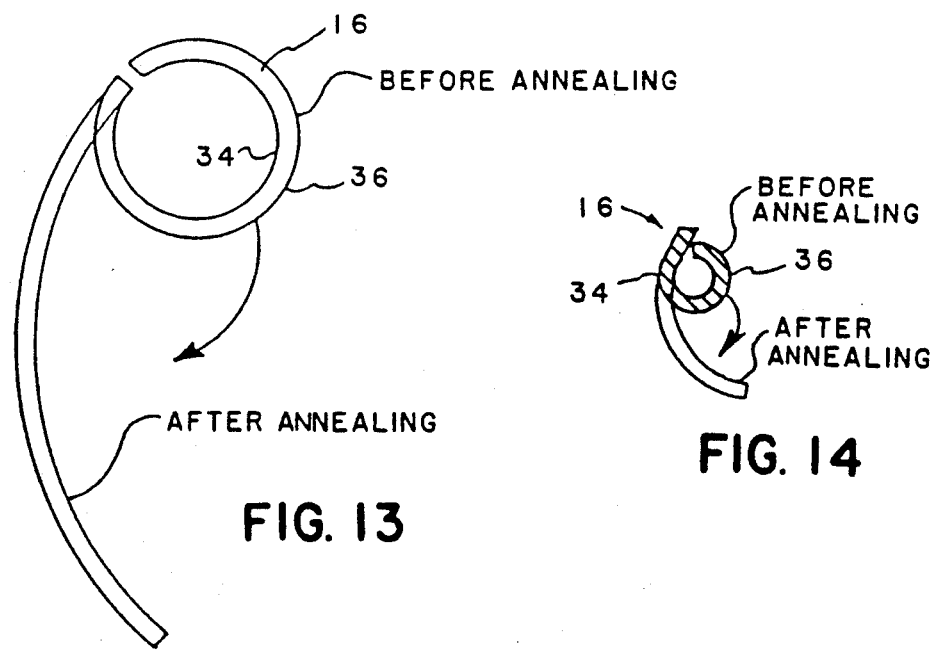
FIG. 13
FIG. 14

CLOSURE CAP WITH A SEAL AND METHOD OF AND APPARATUS FOR FORMING SUCH CLOSURE AND SEAL

This is a divisional application of application Ser. No. 07/061,304, filed Jun. 10, 1987, now U.S. Pat. No. 4,872,304, which is a continuation-in-part application of Ser. No. 06/809,057, filed Dec. 12, 1985, now U.S. Pat. No. 4,709,824, which is a continuation-in-part application of Ser. No. 06/809,058, filed Dec. 12, 1985, now U.S. Pat. No. 4,708,255.

FIELD OF THE INVENTION

This invention relates to a closure cap with a seal in combination with a container and to a method of and apparatus for forming the closure and seal.

BACKGROUND OF THE INVENTION

The function of a closure cap to adequately seal the contents of a container against leakage from or into the container traditionally has been met by incorporating a soft liner to effect a seal between the under portion of the cap lid and the upper face of the bottle neck rim. The liner may be preformed from sheet or formed in place and is produced from materials or laminar combinations or materials which provide easy cold formability to enable the liner to conform to the individual configuration of the neck rim, including manufacturing aberrations and defects. Because of the specialized sealing function of a liner, it is typically made from softer polymers than those selected to perform the more structural cap functions of providing a strong resilient enclosure for the neck opening with a strong mechanical engagement therewith. In some instances stiffer and stronger polymers, including some which are suitable for producing threaded caps, may be foamed to produce an expanded, less dense sheet having a softer, more flexible characteristic and liners may be made therefrom.

An important characteristic sought for liners and not generally met, especially by plastic caps where the cap lid geometry and dimensions may be affected in time by internal pressure and/or heat exposure, is the ability to adjust to such dimensional changes without undue loss of sealing pressure. This calls for a liner with a high level of resilience and resistance to cold flow, particularly for carbonated and/or pasteurized foods and beverages employing plastic caps, to offset the large amounts of cold flow or creep which can result in a dome shape lid. Most soft, conformable liners by their nature will cold flow to adapt to the initial cap geometry but do not have the elasticity or resilience to adapt to such changing cap geometry and can lose their sealing engagement. An ideal liner, therefore, would possess a soft, easily conformable sealing surface, backed by a resilient supporting structure having good resistance to plastic creep to assure a good sealing engagement at all times under all conditions. Such an ideal liner could be vulcanized rubber which can possess both softness and resiliency over long time periods. However, the cost of such seals precludes their use in most applications. On the other hand, plastics which are suitably soft exhibit poor long term creep resistance and resilience. An alternative approach in popular use is a laminate of a springy paperboard substrate with a soft conformable sealing surface such as wax or plastic. However, this approach has significant performance limitations especially when moisture is present.

In any event, all cap liners add another component to the closure and significantly add to its cost.

Because of an economic advantage, attention has been devoted in recent years to developing caps which have an integral, "linerless" seal. The availability of such semi-rigid plastics as polypropylene and polyethylene, which combine a moderate level of strength and resilience with a moderate level of softness and conformability, has made possible popular use of caps with linerless seals. Typically, such caps employ a circular flange under the cap lid having a wedge shape cross section the lower corner of which is thin and flexible and intended to abut the top surface of the bottle neck rim in a compressive action for sealing. The wedge shape flange generally is vertical and provides a sealing area restricted to the width of the narrow, more flexible portion of the wedge shape. For their effective use, they depend upon a very high level of sealing force on a very limited sealing area which makes them susceptible to sealing surface imperfections, wide dimensional variations in container necks and the decay of sealing force over long time periods.

Other linerless caps employ conical flanges which present an angular cross section from the vertical so that capping will cause the flanges to flex and slide out over the top surface of the neck rim thereby creating a somewhat larger sealing area than obtainable with vertical flanges in straight compression. While the larger, though still limited sealing area has positive advantages, this is offset by the fact that the sealing pressure is at the same time reduced proportionately to the increase in sealing area and they too perform poorly with container necks having wide dimensional variations. Another important limitation of such conical linerless features is the difficulty of removing such features from an injection mold. This results in more complex and costly mold construction and operation and also excludes the more rigid plastics from use.

Some other linerless caps employ conical flanges which engage the corners of the neck rim with the underside of the flange. Such features rely on the use of very high sealing pressure directed against a restricted line contact at the rim corners to obtain sealing integrity. In such cases, sealing integrity depends on container rim corners which are without blemishes as produced and which, because they are most susceptible to marring during handling, are suitably protected from such before they are capped and sealed. Also, to the extent that the conical flanges approach the shape of a cylinder, their sealing integrity is significantly affected by out-of-round or other common dimensional variations of the container manufacturing process or variations between manufacturers resulting from the fact that inside neck dimensions typically are not specified. And to the extent that the flanges become more conical, more complex and costly mold constructions and operation result.

Still another type of linerless cap employs a plug configuration in sealing contact with the inside wall of the container neck. This type of seal has the advantage of engaging that surface of the bottle neck which may be freest from manufacturing defects and most protected from incidental marring in handling thereafter. However, wide manufacturing dimensional tolerances and the industry-wide practice of not specifying the neck bore dimension impose severe limitations in trying to obtain consistent sealing engagement and integrity. As a result, resistance to tapered plug seals can push the cap lid up to varying degrees of undesirable dome shapes. Or such plug seals can yield unacceptably wide variations in sealing engagement and pressures. Efforts to overcome such deficiencies have led to proposed designs with flanges extending radially from generally cylindrical plugs wherein the outer rim of the flange makes a narrow sealing contact with the neck bore and is supported by a hinged flexing action. (See, for example, U.S. Pat. Nos. 4,090,631, 4,016,996 and 4,210,251). An additional problem has been encountered with this type of linerless seal in that the lip or rim of the flange may be distorted by the neck rim during capping leading to imperfect seals. Efforts to eliminate this problem can introduce other problems specific to pressurized containers wherein blow-off or missiling of the caps can occur during uncapping. Another effort to avoid distortion of the lip or rim of such a seal is a cap design and method of producing it wherein a radially extending flange having a downward orientation as molded is hingedly "bent", "folded" or inverted into an upward orientation before it is applied to the container. (See U.S. Pat. No. 4,210,251 and British Patent No. 1,024,762). This is accomplished with extra mold portions and actions during part removal or subsequently in an appropriate fixture to hingedly invert the flange. This effort, therefore, requires the molding of a seal of complex shape utilizing a complicated and costly mold construction and molding operations followed by inverting the sealing portion of the seal hingedly to alter its orientation but not its shape.

Importantly in all cases an inherent limitation to heretofore available linerless caps is that the sealing surface has the same plastic in the same physical state as the structural portion of the cap. This has called for a compromise in the softness and conformability of the sealing surface or in the strength of the structural cap portions, or most frequently both, with consequent limitations in the cap usefulness. That is, to achieve a softer more conformable seal, poorer thread strength must be accepted or to achieve greater thread strength, a harder, less conformable seal must be accepted.

Thus, known caps with linerless seals are beset with drawbacks and problems associated with their need to perform with container necks having imperfect sealing surfaces and wide dimensional tolerances; their limited sealing integrity based on restricted sealing area and loss of sealing pressure over extended periods of time especially at elevated temperatures or with internal pressure or vacuum; the fact that sealing surface softness and conformability are limited; the fact that the use of more rigid plastics are not feasible; and the higher cost and complexity of mold construction and operation for a number of the proposed sealing designs.

SUMMARY OF THE INVENTION

In accordance with the present invention, there is provided a new and unique cap with a seal which develops and maintains a positive sealing pressure and engagement with a container opening throughout the shelf life of the contained product and upon opening and resealing the container. The cap is substantially rigid and includes plastic material and generally has a top wall or lid which covers the container opening. Preferably, the cap has a depending skirt which engages the finish of a container or bottle for opening and closing thereof. The seal is made from plastic and depends from the top wall of the cap. The seal preferably is internally spaced from the peripheral skirt and includes an upper end depending from the top wall and a free end with a highly resilient and compressible curled portion which preferably has a relatively soft and conformable sealing surface. As the cap is applied to the container for closing, a curvilinear portion of the seal engages the container finish and readily compresses to provide a relatively large sealing area to seal the contained product. Preferably the cap is linerless with the seal integral with the top wall of the cap.

In a preferred embodiment, the linerless seal includes a substantially annular upper portion integral with and depending from the lid and a substantially annular highly compressible curled free end which defines a hollow "O" or coiled ring. The hollowness of the curled "O" shape and relative thinness imparts a high degree of compressibility as well as the ability to recover from such compression. Additionally, the coiled configuration of the hollow "O" shape, which is affixed to the top wall of the cap at one end and free at its other end, imparts a further degree of compressibility and recovery. Preferably the curled "O" shape includes an arc of from 270 to 360 degrees.

The compressibility of the hollow annular "O" ring is highly advantageous in its ability to adjust to neck dimension variations and out-of-round conditions prevalent in container or bottle manufacturing processes. The "O" ring shape of the seal not only accommodates to such manufacturing variability, but does so without excessive variations in sealing pressure and associated capping, uncapping and sealing difficulties. Because of the low variation in sealing pressure possible with the present invention, lower levels of sealing pressure may be employed while maintaining an adequate minimum pressure to assure a proper seal. Such low sealing pressure allows the plastic material to operate more within its elastic limits thereby contributing directly to relatively low loss of such pressure over long shelf life periods or through accelerated conditions, such as pasteurization processes, which cause creep, i.e., plastic cold flow.

Also, because of the compressibility of the "O" rings shape, its sealing surface can increase significantly resulting in improved seal integrity. This in turn allows lower sealing pressure and resulting sealing pressure losses as already noted.

Additionally, the high compressibility of the seal presents the advantage of being able to use a single cap for different bottles of the same nominal size and engagement means even though different bottle materials (glass, various plastics) and associated neck bore diameters may be used.

Another aspect of the present invention is the location of the curled or curvilinear portion of the seal at or near the sealing contact area. Whether the curled portion is in the shape of an "O" ring, coil or other similar shapes, such as "U" or "J", this feature of the invention enables the sealing surface to adjust to the container both radially and axially. In turn, this contributes to lower localized stress and deformation with the desirable result of lowering plastic creep.

In each of the foregoing embodiments of the integral seal of the invention, whether it includes an "O" ring or other curl shape within the scope of the invention the seal includes a relatively large sealing area and high levels of resilience, compressibility and resistance to plastic creep.

A further contribution of the invention toward maintaining sealing integrity under use conditions comes from the extensive use of curvilinear cross sections in the seal supporting structure which results in more uniform distribution of sealing stresses over larger areas, including portions well removed from sealing contact, and the resultant reduction in localized stresses which cause localized plastic creep.

Moreover, the integral seals of the invention can be a rim seal which engages the top surface or rim of the neck finish, a plug seal which abuts and seals the bore of the container neck, or a corner seal which engages the rim and adjacent depending surface of the container neck. In each of the described seals of the invention, the curled portion can face outwardly or inwardly.

In another preferred embodiment, the stretched linerless seal preferably has balanced residual strain wherein the plastic at the sealing surface is in a state of tension and relatively soft and compressible and the substrate or supporting structure is in a balancing state of compression and relatively hard and resistant to compression and which maintains the state of tension and relative softness of the opposing sealing surface.

In yet another preferred embodiment the linerless sealing surface is made relatively softer than the other cap portions as a result of altering it by stretching to produce microscopic voids employing plastics having this characteristic.

In another preferred embodiment, the linerless seal includes a substantially annular upper portion integral with and depending from the lid and a substantially annular highly compressible curled lower portion which has a "J", "U", "O" or coiled cross section. Preferably the curled lower portion has a sealing surface which is softer than the rest of the cap as a result of its method of manufacture which includes stretching it.

In forming the cap and integral seal of this invention, the cap is formed first by conventional molding techniques, such as injection or compression molding, with an internal preform for the integral seal. The preform includes an annular wall which is spaced inwardly from the peripheral skirt and which is integral with and depends from the lid in an essentially vertical manner. Thereafter, the curled lower portion of the integral seal is formed by forming means which engage the wall to form and define the curved sealing surface and which stretches it to achieve the desired softnesss of preferred embodiments of the invention.

The curled lower portion is formed by a curling tool which engages the lower free end of the cylindrical preform, and turns it outwardly toward or inwardly from the skirt and then upwardly channeling and altering the direction of such movement over its working surfaces. Preferably the initiation of the curling action is facilitated by providing a taper to the lower free end of the cylindrical preform. The curling action at this point produces a "J" or "U" shape in such a free end. To produce an "O" or coil shape, after leaving the working surface of the tool, the free end takes an upward and inward or outward direction relative to itself, which results from the continuing compression and the stresses imposed by its plastic memory, to complete the formation of a hollow "O" ring. Optionally, the compression of the cylindrical portion can proceed beyond this point and produce a more fully coiled ring. The working surfaces of the curling tool are preferably curved but optionally a plurality of flat surfaces may be employed.

To facilitate the curling operation or to alter the dimensions, shape or character of the resultant linerless seal, the curling tool can be heated and can be used in straight compression with, with or without spinning, or rolled along the free end of the cylindrical portion during its shaping. The free end of the cylindrical portion may be curled simultaneously or sequentially. Optionally, the linerless seal can be exposed to elevated temperatures for short periods before capping to alter its dimensions, shape or character or the preform for the linerless seal can be heat treated for the same purpose.

The seal produced by the curling method of the present invention includes a relatively soft and conformable plastic sealing surface and a substrate or supporting portion of the same plastic which is relatively stronger, more resilient and creep resistant. This is achieved by producing and controlling strain within the plastic of the integral seal itself. Preferably the outer sealing surface of the seal is in a state of tension while the inner or supporting substrate is in a state of compression. Optionally the cap may be made from a multiphase plastic of the invention so that the stretched sealing surface also includes residual microscopic voids which soften it.

In another embodiment, the curled free end, where it contacts the depending wall after formation of the O-ring shape, can be welded to said wall to form a sealed hollow space within resulting in a linerless seal having pneumatic sealing qualities.

Another feature of the invention is that the curling operation of the invention may be performed in sequence with or as part of other steps taken in the manufacture of the cap. That is, it may be performed during or consequent to removal from production molds or during or consequent to cap finishing operations such as lid decoration. It also can be performed simultaneously with or consequent to a curling operation to produce the tamper evident separable or breakaway ring of my copending U.S. patent application, Ser. No. 809,057. Also the curling operation has been demonstrated to be non-critical in respect to unusual control or conditions so that automatic operation to produce uniform product can be used to achieve high quality at low cost.

Another feature of the invention is that the cap and perform for the integral seal are first produced in injection molds employing widely accepted and used mold design and technology. The simple shape of the cylindrical preform imposes no significant concern, limitation or expenses in mold design and operation. Low cost molds employing traditional stripper ejection mechanisms may be used because of the absence of undercuts which otherwise could distort or tear. This also assures short cooling cycles in the mold.

Yet another feature of the invention is that relative height and diameter of the curled seal is determined in a separate reforming operation so that a single cap as molded, may be used to produce caps which will fit a variety of bottle neck designs where dimensions, such as thread or locking ring heights, wall thickness or internal diameter varies. The cost of the curling tools and the curling operation affect overall cap cost very little, enabling the cap manufacturer to take advantage of the economies, of larger scale production for a number of customers or user from fewer and larger production molds.

In addition, the curling methods of the present invention also can produce linerless caps which include a relatively soft and conformable sealing surface of plastice and a substrate or supporting portion of the same plastic which is relatively stronger, more resilient and creep resistant. This is achieved by the curling methods of the present invention which produce stresses in the plastic of the curled portion, wherein the stresses in the outer sealing surface are in a state of tension or extension and the stresses in the inner supporting substrate are in a state of compression. An additional feature is that, when using preferred plastics of the invention, softness of the sealing surface is further enhanced by the development of microscopic internal voids produced thereat by the method of the invention.

Additionally, because of the ease of cap ejection from the production mold and because of the highly compressible "O" ring shape with its attendant advantages for distributing applied stress, stronger and more rigid plastics can be used for performance or economic reasons.

In another embodiment of the invention as a plug seal, potential blow-off of the cap during opening when used to contain products under pressure can be avoided by assuring that the seal comes out of engagement with the container substantially before loss of the threaded or other attachment engagement. This can be accomplished without the concurrent risk of distortion of the seal during capping which can occur in other designs which have narrow free ends and which employ such serial engagement and disengagement of the sealing feature and threads. This advantage results from the full roundness of the bottom of the seal and its ability to adjust to cap-to-neck misalignment by movement in the horizontal plane because of its curled shape and the relative displacement of its lid attachment and sealing planes.

Another embodiment of the invention is to locate the "O" ring shape seal or other shape having a curvilinear or curled sealing contact portion in such a relationship to the rim of the bottle neck that upon its compression by the neck during capping it forms a sealing surface on the inside corner of the rim and the surface adjacent to it on the neck rim and vertical wall. In this manner a very positive seal is achieved.

Another embodiment of the invention is to shape the seal into a "J" shape by abbreviating the extent to which the depending cylindrical cap portion is curled, wherein the sealing surface is the curved or curled lower extremity and the attachment site to the lid is its upper annular extremity.

In another embodiment of the invention, the top surface of the bottle neck rim is employed for the sealing engagement using a cap having a "U" shape or semi-circular cross section integral seal, wherein one leg is attached to the cap lid and the other is unattached but adjacent the lid and optional restraint thereon while the lower curvilinear portion serves to provide the sealing surface. Such a shape can be wide enough in relation to the neck thickness so that after torquing up the cap the highly compressible "U" shape feature can overlap one or both edges of the neck rim. Also, the seal can be more fully curled so as to form an "O" ring shape or less fully curled to form a "J" or quarter-round shape, wherein their lower curvilinear or curled portions engage the neck rim top surface.

In another embodiment, a quarter-round seal can be provided, wherein its free end is in engagement with coacting restraining means located on the interior wall of the cap skirt while the curvilinear portion engages the exterior corner of the neck rim.

Still further, a more fully curled seal can be provided so that a coiled ring is achieved which produces added resilience.

Moreover, the bottle neck rim can be produced with a concave surface between its inside and outside walls to minimize ovaling of the curled seal to further reduce localized deformation and plastic creep.

In still another embodiment, the above described bottle neck rim can be used as the curling tool to post-form the curled portion of the seal, thereby combining the curling operation with the capping operation.

In another embodiment of the invention the curled free end may be horizontally displaced from its opposite end which is integral with the top wall by including a relatively straight or generally horizontal portion therebetween. This allows the o-ring seal of the invention to float and compress more freely, without a constraining influence from the portion of the seal which is fixed by its attachment to the top wall.

Another embodiment calls for the cap lid portion bounded by the linerless seal to be made of a different material (e.g., metal, another plastic, etc.) with the curled free end itself used to engage the lid prior to capping and then used as well to seal the lid to the cap and the cap to the container upon capping.

In another embodiment the curled free end of the linerless seal may include radial slits away from the sealing surface so that the resilience of the curled free end may be enhanced.

An important feature of the invention is that it provides conformable, resilient, integral cap seals with superior ability to conform to the neck configuration of individual containers including those with typical manufacturing defects and aberrations.

Another feature of the invention is that it assures high sealing integrity even when used with container necks having wide manufacturing dimensional tolerances.

Yet another feature of the linerless seal of the invention is that it provides high sealing integrity over long shelf life periods with products which are pressurized or under vacuum and/or those subjected to elevated temperatures such as when pasteurized.

Another feature of the invention is the use of the seal forming method to alter and enhance the physical properties of the plastic to provide optimum sealing characteristics.

Another feature of the invention is that it can employ more rigid plastics than other linerless seal designs.

An additional important feature of the invention is its low cost manufacturing method using low cost molds and molding operations, fewer and larger molds and an integrated curling operation.

BRIEF DESCRIPTION OF THE DRAWINGS

The following is a description of the accompanying drawings of illustrative embodiments of the invention. It is to be understood that the invention is capable of modification and variation apparent to those skilled in the art within the spirit and scope of the invention.

FIG. 11 is the same as FIG. 8, except the illustrated stresses are in the hoop direction;

FIG. 12 is a horizontal plan view of the seal of FIG. 11;

FIG. 13 schematically illustrates what occurs to the seal of FIG. 11 upon release of the hoop stress;

FIG. 14 schematically illustrates what occurs to the seal of FIG. 8 upon release of the stresses in the direction of curl;

DETAILED DESCRIPTION OF THE DRAWINGS

Figure 1:
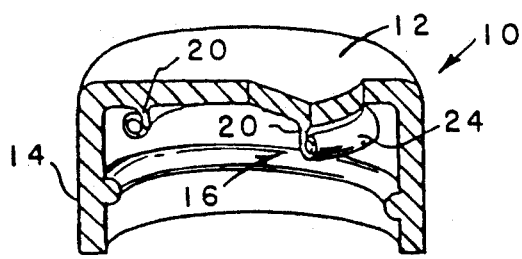
FIG. 1 is a top perspective view of a cap of the invention, partially broken away to show a preferred embodiment of the integral or linerless seal.
Figure 2:
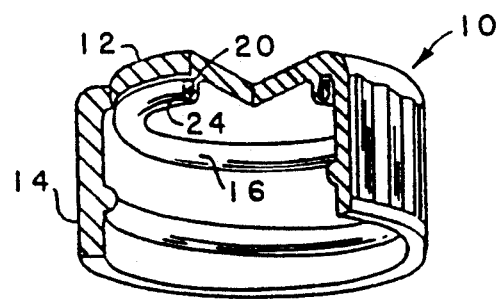
FIG. 2 is a bottom perspective view of the cap of FIG. 1, also partially broken away to show the linerless seal.

Referring to FIGS. 1 and 2, there is shown a semi-rigid, threaded, plastic cap 10, having a lid 12, a depending peripheral internally threaded skirt 14 and an internal integral or linerless seal 16. The illustrated integral seal 16 includes a cylindrical or annular vertical wall 18 having an upper end 20 integral with the lid 12 and a free curved free end 22. As shown, the end 22 of the integral seal 16 is curled outwardly and forms a hollow annular "O" or coiled ring 24.

Figure 3:
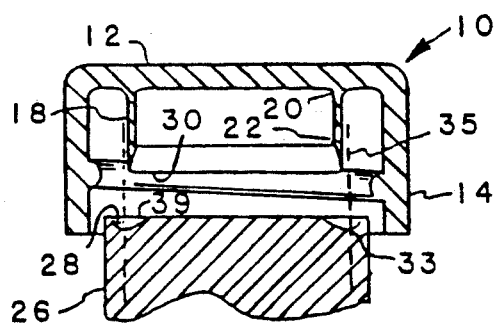
FIG. 3 is a longitudinal sectional view of the cap of FIGS. 1 and 2 after molding and with a preform for the linerless seal about to be engaged by a curling tool of the invention to produce an outward curl which provides the "O" ring seal shown in FIGS. 1 and 2.
Figure 4:
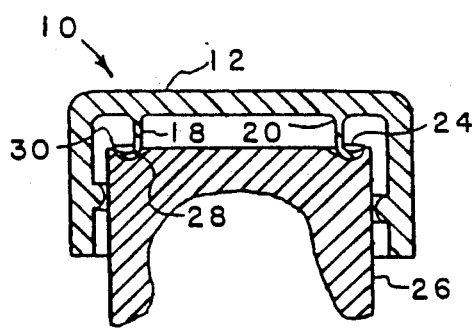
FIG. 4 generally is the same as FIG. 3, except that the curling tool has engaged the preform for the seal and initiated curling thereof.
Figure 5:
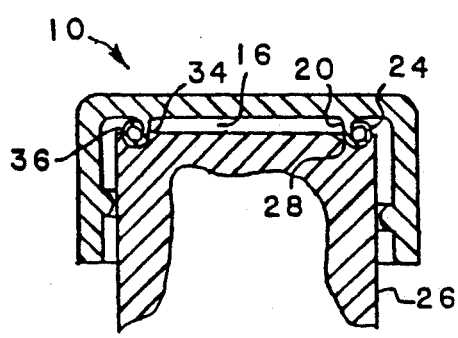
FIG. 5 generally is the same as FIG. 3, except that the completed outward curl of the linerless seal has been formed.

Referring to FIGS. 3-5, there is shown a preferred method of forming the curled portion 24 of the seal 16. In FIG. 3 the cap 10 already has been formed by conventional molding techniques, such as injection molding, with a vertical cylindrical or tubular wall 18 having its upper end 20 integral with the lid 12 and with its lower free end 22 ready for curling by the illustrated curling tool 26. As shown in FIG. 3, there is a taper in lower end 22 extending from the rim 30 which facilitates the initiation of the curl 24. The taper preferably extends from rim 30 for a distance sufficient to assure a full round curve to the curl 28 adjacent its rim 30. For a typical curl 24 of the invention having a width of 0.100 inches and a thickness of about 0.015 inches, the taper may extend a distance of about 0.050 to 0.075 inches from the rim 30. As shown in FIGS. 3-5, the free end 22 and the curl 24 are free of abrupt changes in thickness.

The curled portion 24 of the seal 16 is formed with a curling tool 26, which in FIG. 3 has been positioned within the cap 10 ready to engage the preformed wall 18 at its lip or rim 30. The curling tool 26 includes a circular or annular groove 28 of a concave cross section suitable for shaping and dimensioning the curled portion 24.

As shown in FIG. 4, the forming operation is accomplished by pressing the groove 28 of the tool 26 against the rim 30 of the wall 18. In this embodiment the deepest portion 33 of the groove 28 representing the center of its concavity is located outwardly of the cylindrical plane of the wall 18. This is illustrated by the dotted lines 35 of FIG. 3. Also the groove 28 has a slanted portion 39 inwardly and tangent to its concavity to facilitate centering of the tool and cap. As movement of tool 26 relative to the wall 18 continues toward the lid 12, the cylindrical sides of the wall 18 are centered within groove 28 by the slanted portions 39 and are then forced outwardly and then upwardly to assume an interim "J" shape as shown in FIG. 4. As this relative movement continues, the rim 30 is forced upwardly out of groove 28, and at the same time is pulled inwardly in response to the stresses developed therein while being shaped by the tool 26, thereby producing the desired "O" ring curl 24 with an attachment site 20 to the lid 12 close to the plane of the inside diameter of its horizontal cross section.

To facilitate the curling operation, in the case of polypropylene, the tool 26 may be at a temperature of about ambient to about 300 degrees F. but preferably about ambient to about 150 degrees F. for curling cycles of about one-half to three seconds. Lower temperatures and shorter cycles are preferred to maximize the desired strain of the invention imposed by the curling operation on the plastic of the curl 24 as discussed hereinafter with respect to FIGS. 8 to 14.

After formation of the curl 24 the curling tool 26 is withdrawn from the cap 10 and the cap 10 is ready for capping and recapping. The "O" ring seal 16 includes a bottom sealing portion 32, an inside sealing portion 34 and an outside sealing portion 36. Depending on whether a rim, corner or plug seal is desired one or more of these surfaces can be used for sealing engagement with the appropriate portion of a container or bottle neck. In each embodiment a curled or curved portion of the seal 16 is used as a sealing surface.

Figure 6:
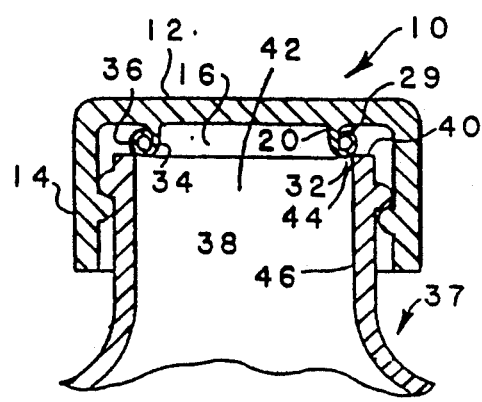
FIG. 6 is a longitudinal sectional view of the cap and "O" ring linerless seal of FIGS. 1 and 2 ready for engaging the neck finish of a bottle for closing the bottle and sealing the contained product.
Figure 7:
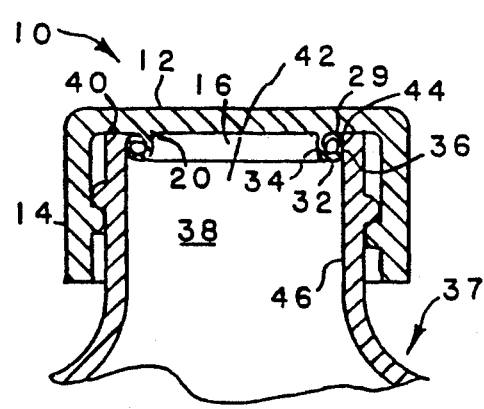
FIG. 7 is the same as FIG. 6, except that the bottle has been closed and sealed by the cap and the linerless seal which is in the form of a plug seal.

Referring to FIGS. 6 and 7 there is illustrated the use of the "O" ring linerless seal 16 of FIGS. 1-5 as a plug type seal for a bottle 37 (partially shown) having an externally threaded neck 38, a rim 40 and an opening or bore 42. As the cap 10 is threaded onto the bottle neck 38 the curled bottom portion 32 of the seal 16 meets the interior annular corner 44 of the rim 40 and the intersecting internal neck wall 46 which forms the bore 42. Thereafter, the seal 16 seats itself within the bore 42 with the external side sealing portion 36 in sealing engagement with the wall 46 of the bore 42. This is accomplished because of the rounded bottom portion 32 and the ready compressibility of the "O" ring shape, wherein the compressed side sealing portion 36 of the ovalized seal 16 forms a firm engagement with the wall 46 defining the bore 42.

A contribution to low localized stresses and low plastic creep by the "O" ring shape 24 of the invention lies in the fact that the curved side portion 36 used for the sealing engagement with the neck inner wall 46 lies between and is supported by both lower and upper curl portions 32 and 29. In this manner the level of sealing stress transferred to each supporting portion is greatly lower then with only one supporting portion, typical of other linerless seals.

The side portion 36 adjusts to the constraint of wall 46 with resultant compression, the stresses of which are transmitted to and distributed throughout the "O" ring 24. The "O" ring 24 responds to such stress by a reduction in both its external and internal diameters of its horizontal cross section in conjunction with an ovaling of its radial cross section. For example, an "O" ring curl 24 having an external diameter of 0.900 inch and an internal diameter of 0.707 inch when seated in the bore of a neck having an internal diameter of 0.846 inch produced an immediate reduction of 6 percent in its external diameter and a reduction of 1.2 percent in its internal diameter, demonstrating a significant distribution of sealing stresses throughout all portions of the "O" ring seal of the invention. Such extensive distribution of stress throughout the "O" ring 24 derives from its hollow "O" ring shape and the displacement of attachment site 20 from the sealing surface at the side portion 36. This results in an advantageous reduction in stress concentration and creep and the loss of sealing pressure over time which can result. Additionally there occurs an improvement in sealing engagement and integrity derived from flattening of the curved side portion 36 as it adjusts to the constraint of the wall 46 which increases the sealing area. Also even though a large amount of compression occurs in the "O" ring 24, torque levels required to seat the cap 10 and to remove it remain in a normal range.

The preferred curling method of the invention illustrated by FIGS. 3-5 produces a linerless seal 16 which possesses the desired large sealing area, a high level of resilience and elasticity and a high level of resistance to plastic creep. In addition, the reforming method modifies the physical properties of the plastic in such a way as to further enhance its sealing characteristics. That is, the plastic at the sealing surface of the seal 16 is made softer and more conformable and at the substrate and supporting portions is made stronger, more resilient and creep resistant as a result of the stresses imposed on the plastic during the curling operation. This enhancement will now be explained in conjunction with reference to FIGS. 8-14.

The curling operation, by imposing an alternative shape on the preformed cylindrical wall, imposes, it is believed, two sets of balanced residual stresses and stress differentials to the resultant shape in the seal 16. That portion of the seal 16 which is stretched is in extension or a state of tension and that portion which is compressed is in a state of compression. The level of stress varies with the degree of extension or compression and, as in any static condition, the total amount and direction of each kind of stress balances and maintains the other.

Figure 8:
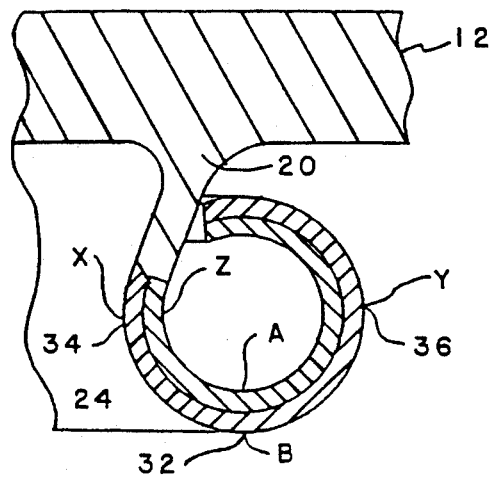
FIG. 8 is an enlarged sectional view of the linerless seal and adjacent cap portion shown in FIG. 6 schematically illustrating the stresses in the seal in the direction of the curl.
Figure 9:
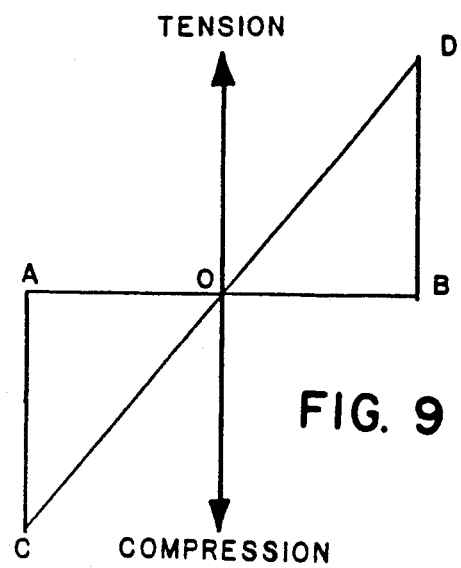
FIG. 9 is a graph schematically illustrating the balance of stresses illustrated in FIG. 8.

One set of balanced residual stresses occurs in the direction of curl as a result of the extension and compression of the preformed cylindrical wall 18 across its thickness to form the "O" ring or coiled ring shape 24, as shown in FIG. 8. At and near the convex exterior surface (sealing surface) represented by points B or Y the plastic is stretched in the direction of the curl and is in a state of high residual tension. The opposite concave interior surface, represented by points A or Z, is compressed in the direction of the curl and is in a state of high residual compression which balances and maintains the state of tension at or near the exterior convex surface. FIG. 9 shows the direction, sum and approximate distribution of these stresses across the thickness of the plastic including the neutral point 0 and points of maximum compression and tension at or near the inner and outer surfaces. In the normal practice of the invention maximum tensile stress will occur over a finite distance from the surface. The sum of the compressive stress defined by points AOC equals that of the tensile stress defined by the points BOD.

Figure 10:
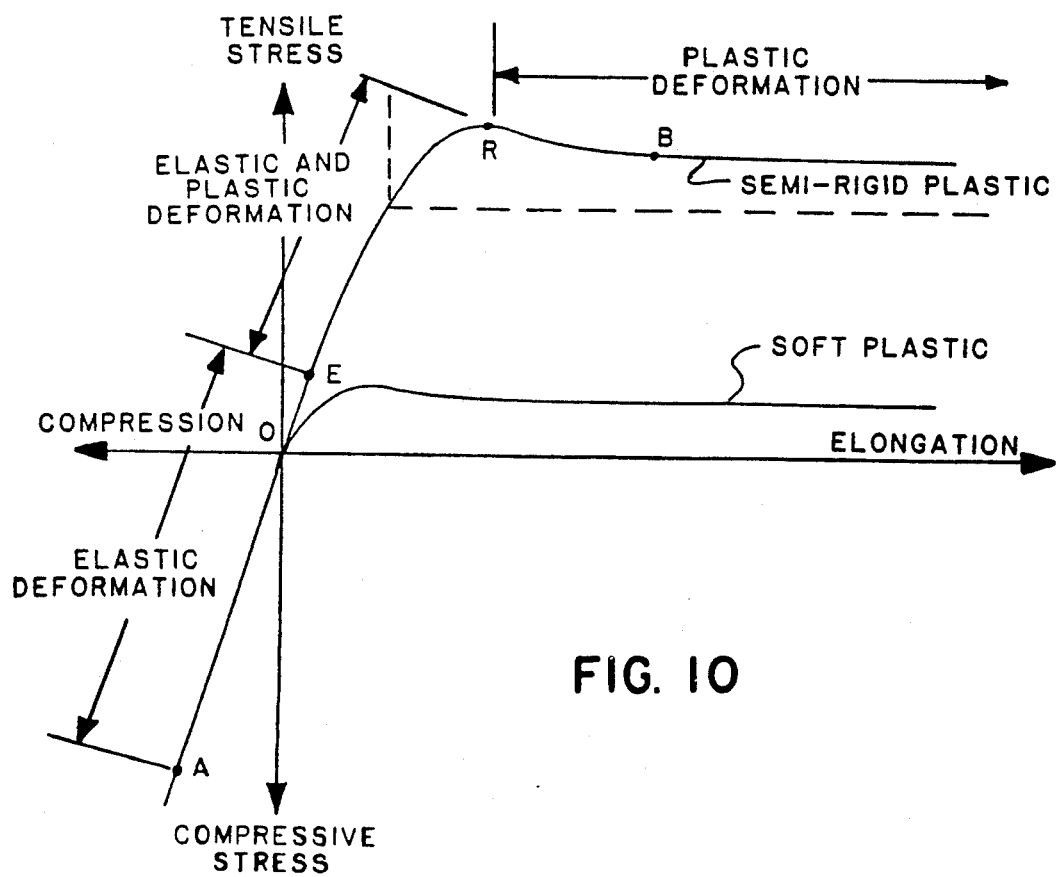
FIG. 10 is a stress strain graph for the stresses in the linerless seal shown in FIG. 8.

IN FIG. 10 there is shown a typical stress-strain curve for a semi-rigid plastic (e.g. polypropylene) suitable for the practice of the invention. The conditions of stress and elongation or compression in the direction of curl at points B and A in FIG. 8 are shown on the curve at typical locations for the practice of the invention (preferably 50% of the elongation to yield and beyond and the corresponding level of compression). The dotted lines define that portion of the stress-strain curve wherein point B, representing the sealing surface of the invention, will typically be found near to or well beyond the tensile yield point R. Also shown in FIG. 10 is a typical stress-strain curve for a much softer plastic such as ethylene-vinyl acetate copolymers or polyvinyl chloride plastisol which are popularly used for cap liners because of their soft conformable nature. When the portion of the curve for the semi-rigid plastic defined by the dotted lines is compared to the curve for the softer plastic, a similarity is noted wherein small amounts of stress result in large amounts of deformation which demonstrates the desired softness, conformability and enhanced sealing qualities of the invention.

Thus, it can be seen that the curling process of the invention used to create the desired shape for superior sealing performance also modifies the physical properties of the plastic at the sealing surface from those of a more rigid, unyielding material suitable for overall cap strength and integrity to those of a softer, more yielding and conformable material suitable for improved sealing characteristics.

From the location of point A in FIG. 10, it can be seen that the same curling action which modifies the properties of the sealing surface represented by points B or Y in FIG. 8 beneficially modifies the properties of the supporting substrate represented by points A or Z oppositely, but also beneficially. Because the substrate at points A and Z is highly compressed, its strength and resiliency is maximized in that the amount that it can be deformed before any plastic or permanent deformation occurs is significantly increased (proportional to the ratio of AE to OE of FIG. 10). These factors are highly beneficial towards maximizing the ability of the seal supporting substrate at point A to generate the maximum amount of sealing pressure on its sealing surface (e.g., at point B) and to resist decay of such pressure over long time periods resulting from plastic creep.

At the same time, a second set of balanced stresses occurs normal to the first set as a result of the increase and/or decrease of the hoop diameter of the cylindrical cap portion 18 of FIG. 3 when it is postformed or reformed into the "O" ring 24 or other shape of the seal of the invention as shown in FIGS. 4 and 5. If it is considered that the cylindrical portion 18 is composed of an integrated stack of hoops, each of which must be expanded radially (stretched) or compressed to produce the reformed shape, then a condition of tension or compression will be imposed on each of the hoops in the resultant shape as shown in FIGS. 11 and 12 (respectively a radial cross section and a horizontal plan view of the seal 16). The level of stress is relative to the amount the hoops have been expanded or compressed and tension is highest at point Y, compression is highest at point X and hoop stresses are nil at the intermediate location of the original cylindrical preform 18, points C and D.

Since two unidirectional sets of stresses operating normal to one another are imposed by the curling operation of the invention, their effect on the various portions of the seal 16 are additive. Where tension in the hoop direction is imposed at the same location as tension in the curl direction (e.g., point Y), the plastic will further increase in softness and conformability. Where hoop compression is imposed at the same location as tension in the curl direction (e.g., point X), the plastic will exhibit a lesser increase in softness, perhaps even a decrease in softness and an increase in strength and resiliency when the level of compression is higher than the level of tension. Where the plastic is in compression in both the hoop and curl directions (point Z) the greatest increase in strength and resiliency occur. At points C and D hoop stresses are nil so there is no additive effect. Therefore the development of a high state of tension in both the hoop and curl direction at point Y favors the use of the outwardly directed sealing surface 36 in a plug type seal. The development of a high state of tension in the curl direction at point B favors the use of the downwardly directed sealing surface 32 in a rim seal. The fact that point X is in the lowest state of tension is not detrimental to the practical application of the stresses of the invention since the inside sealing surface 34 is not ordinarily used. However, since this portion of the seal 16 serves to support the lower and outer sealing surfaces 32 and 36, the high state of compression at point Z and throughout most of the seal wall at that location is highly beneficial. Thus, it can be seen that the distribution of stresses imposed by the curling operation of the invention is optimal for the highest performance of the seal 16 resulting in enhanced softness and conformability of the plastic at the sealing surfaces 32 and 36 and in enhanced strength and resilience of the plastic of the substrate and supporting portions represented by points A and Z of the seal 16.

That the stresses described in the above analysis do in fact exist and are distributed in the manner described is demonstrated by annealing tests to observe the changes in shape which develop as such stresses are relieved. For such a test 0.020 inch thick cylindrical walls 18 of polypropylene were curled in the manner of the invention to yield "O" ring shapes 24 having a ring outside diameter of 1.230 inches, inside diameter of 1.030 and a curl outside diameter of 0.100 inches. The "O" ring 24 was then split radially to facilitate the full release of imposed stresses and then exposed to a temperature of about 300 degrees F., somewhat under the plastic's melting point, for five minutes. Under these conditions the "O" ring 24 opened up in the hoop direction to a radius of 2.5 inches, a four-fold increase, demonstrating the presence of very high levels of hoop stresses and hoop stress differentials. At the same time "O" ring 24 opened up in the curl direction to a radius of about 0.150 inches, a three-fold increase, demonstrating the presence of very high levels of stresses and stress differentials in the direction of the curl. These results illustrated in FIGS. 13 and 14, demonstrate the conclusion drawn by the preceding analysis of the contribution of the stresses imposed by the curling operation to the development of the high levels of sealing integrity of the invention through the alteration and enhancement of the physical properties of the plastic used to manufacture the cap 10.

Figure 15:
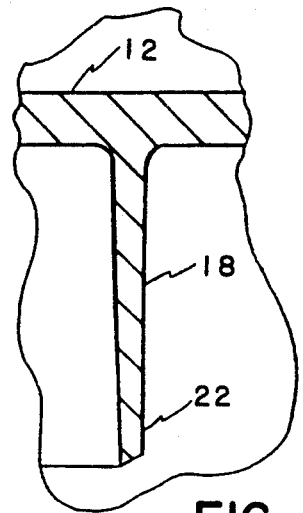
FIG. 15 is a longitudinal sectional view of portion of a lid with a depending annular band prior to curling.
Figure 16:
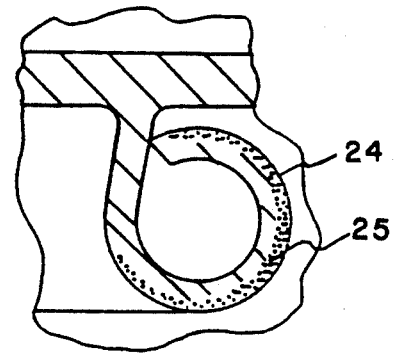
FIG. 16 is the same as FIG. 15, except that the annular band has been curled with the resultant production of microscopic voids.
Figure 17:
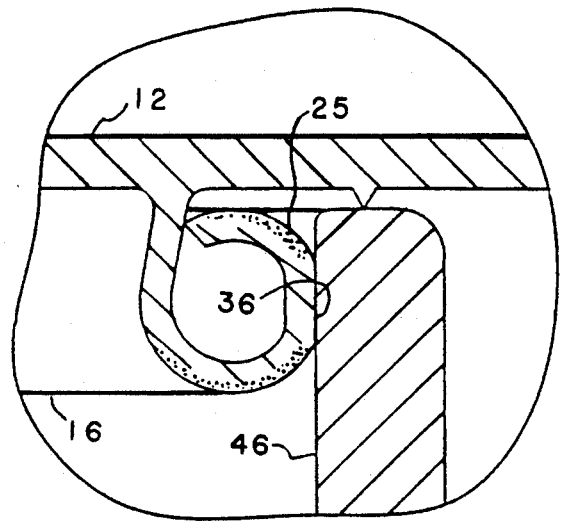
FIG. 17 is the same as FIG. 16, except that the curled free end is in sealing engagement with the inside of a container neck and some of the microscopic voids have been eliminated in the sealing area.

Referring to FIGS. 15 to 17, there is shown a feature of the invention wherein the sealing surface is softened as a result of the production of microscopic voids thereat by employing plastics which form such voids after stretching. FIG. 15 shows the wall 18 integral with lid 12 and including free end 22 prior to curling. FIG. 16 shows the curled free end 24 including microscopic voids 25 produced during the curling operation which preferably is done at ambient temperatures to facilitate the creation of the voids 25. The size and/or number of the voids 25 are in relationship to the degree to which the plastic has been stretched. FIG. 16 shows that the void formation is greater where the plastic has been stretched most in the hoop direction at the outside sealing portion 36 while lower surface 32 and upper surface 29 possess microvoids primarily as a result of stretching in the curl direction. FIG. 17 shows the seal 16 employed as a plug seal against the interior neck wall 46 and the compression of the outside sealing portion 36 by the sealing engagement with the resultant elimination of the voids in the seal area.

Another feature of the invention is that from a single design of molded cap and seal preform, the kind of seal and its dimensions can be varied to adapt to a variety of bottle neck dimensions and bottle materials. For instance, a molded cap with a cylindrical preform suitable to be used for a plug seal for a plastic bottle can also be used to produce a rim seal for the same or other plastic bottle or a rim seal for a glass bottle simply by employing alternate curling tools. In the same manner the seal height for a rim seal can be readily altered in the curling operation to permit its use on bottles having a variety of thread heights. In this manner a single injection mold can be used to produce caps to fit a variety of bottle dimensions producing economies of scale in the cap molding and manufacturing operation.

Still another feature of the invention is that the caps and linerless seals of the invention can be removed and unsealed without blow-off when the contents of the container are under pressure. For example, in a plug seal of the invention the distance between the under part of lid 12 and the sealing engagement of outside sealing surface 36 should equal no more than ½ the pitch of the cap threads—so that at least ½ turn of thread engagement remains after the outside sealing surface 36 clears the inside wall 46 of the bore 42 during uncapping. For most caps this dimension would be about 0.060 to 0.090 inches. In a rim seal the amount of elastic compression of seal 16 should be no more than ½ the pitch of the cap threads—so that at least ½ turn of thread engagement remains after the lower sealing surface 32 of seal 16 clears the rim 40 of bottle neck 38. This dimension also would be expected to range typically between 0.060 to 0.090 inches.

In the case of a 28 mm polypropylene cap typical dimensions of the "O" ring curl 24 of seal 16 are about 0.040 to 0.150 inches for the curl diameter and about 0.007 to 0.030 inches in wall thickness and the radial cross section preferably forms an arc or a continuous curve of at least 180 degrees. As a plug seal it typically will have an outside diameter at its sealing surface 36 which is 0.020 to 0.060 inches larger than the inside wall 46 of neck 38 with larger ranges applicable to larger size caps. Preferred dimensions for the curl 24 to provide maximum plastic property enhancement through imposed stresses by practice of the present invention call for maximum wall thickness and minimum curl diameter low curling temperatures and high curling speed.

Cap sizes typically range from under 20 mm to 120 mm and bottle and/or jar sizes range from under 2 ounce to 128 ounce capacity. Larger capacity containers such as drums or kegs are also suitable for the practice of the invention as are smaller vials and other containers.

Useful plastics which can be used for forming the caps and linerless seals of the invention include polypropylene, polyethylene, polystyrene, acrylonitrile-styrene-butadiene polymers, and many other semo-rigid to rigid plastic materials. Optionally other plastics employed in the practice of the invention are chosen from the group of plastics which have in common the fact that when stretched beyond their tensile yield point they develop microscopic voids or fissures within the plastic which serve to soften it and make it more compressible, even when residual tensile strain is not present. The group of plastics manifesting this behavior includes essentially all polymer classes (e.g., polystyrene, polyvinyl chloride, polyolefins, polycarbonates, polysulfones, polyesters, nylons, etc.) and preferably are selected from the group of plastics known as alloys, blends, multipolymers, multiphase polymers or other nomenclature, many of which are listed in Modern Plastics Encyclopedia, 1986-1987, pages 105 to 111, the entire disclosure of which is incorporated herein by reference. Examples of such polymers are propylene copolymers (e.g., Shell 7522), ethylene-propylene copolymers (e.g., Himont SB781) and rubber modified polysytrene (e.g., Monsanto Lustrex 4300). Typically the Shell 7522 propylene copolymer produces voids in the range from about 0.25 microns to about 3.0 microns.

The linerless seals of the present invention can be used in a wide variety of caps including combinations with other materials (e.g., caps having metal lid portions or portions utilizing different plastic than that used for the seal). Such linerless seals may be used to close and seal a wide variety of containers for a wide variety of products including: beverages, including carbonated soft drinks and pasteurized beverages such as beer; foods, especially those where container sealing performance is critical, including oxygen sensitive ones such as mayonnaise, peanut butter and salad oil, and including corrosive ones such as vinegar, lemon juice; and household chemicals, including bleaches and detergents, drugs and cosmetics and other products requiring the highest integrity seal and reseal under the widest range of distribution and use conditions.

Further, the linerless seals of the present invention can be used in conjunction with other types of linerless seals including other type seals of the invention and may employ various or all surfaces of the neck 38. Moreover, the linerless seals of the present invention can be used with a wide variety of caps, including snap caps and threaded caps with or without breakaway rings. Specifically, the linerless seals of the present invention can be used with the caps having the breakaway or separable rings disclosed in my U.S. Pat. No.: 4,709,824.

Figure 19:
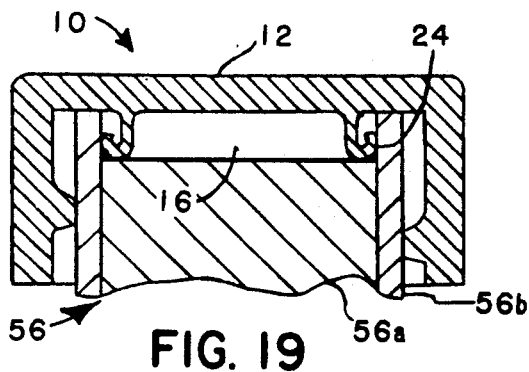
FIG. 19 is generally the same as FIG. 18 except that the curling tool has completed the formation of the O-ring linerless seal.
Figure 20:
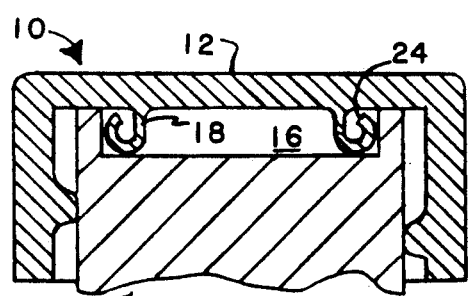
FIG. 20 is generally the same as FIG. 19 except that the curling tool working surface is unitary.
Figure 18:
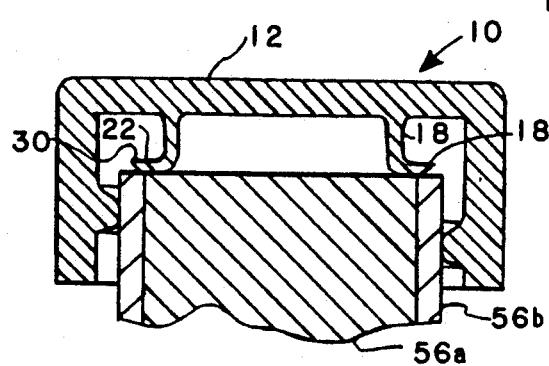
FIG. 18 is a longitudinal cross section of a cap and an optional curling tool of the invention in early engagement with a preform for a linerless seal of the cap.

Referring to FIGS. 18-20, there is shown another method of the invention for forming the curled portion 24 of the seal 16, wherein the curl is tighter and stretching is greater relative to FIGS. 1 to 7. FIG. 18 shows the tubular wall 18 has been engaged and turned outwardly by tool component 56a to form a horizontal wall portion 18a. The outward horizontal direction of the wall portion 18a upon compression by tool component 56a is assured by an outwardly directed bevel to the free end 22 at rim 30. Optionally the top surface of interior tool component 56a may be beveled outwardly or wall 18 may be molded with a conical or outwardly flaired free end to assure the outward direction of wall portion 18a. FIG. 19 shows how the horizontal wall portion 18a is turned upwardly to produce the relatively tight U-shaped curl 24 by suitably interrupting the travel of tool component 56a and continuing the travel of tool component 56b. After being turned upwardly the free end 30 of wall 18 turns inwardly in a tight curl as a result of the stresses imposed by its plastic memory. The curled ring 16, produced by this method, can be a "J", "U" or quarter-round shape by employing suitable dimensions for wall 18 or tool 56 and/or by adjusting the amount of compression of wall 18 by tool 56. The cessation of travel of tool component 56a relative to tubular wall 18 and tool component 56b may be abrupt, but preferably it is gradual to facilitate formation of a tightly curled ring 16. Preferably the preform wall 18 is vertical where the curled portion 24 is produced to achieve the maximum applied curvature and the greatest degree of stretching and softening.

Optionally, the tool 56 may be unitary as shown in FIG. 20 or the tool components 56a and 56b may be employed to do their respective portions of the curling operation at separate work stations. Another option is to produce the curled free end 22 inwardly by suitable alteration of the taper of the wall free end 22 and the dimensions and sequence of operation of tool components 56a and 56b. As illustrated the curl of the embodiment of FIG. 20 is not as tight as shown in FIG. 19. In this instance the vertical component 56b is spaced further away from the depending wall 18 then the corresponding vertical component 56b of FIG. 19. Thus, by this method the tightness of the curl is readily adjustable.

Figure 21:
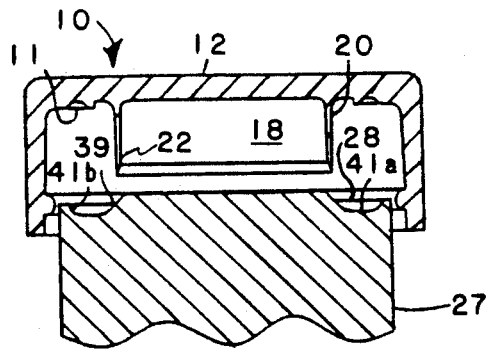
FIG. 21 is a longitudinal cross section of a cap with a preform for a linerless seal positioned above a curling tool suitable for producing a linerless seal wherein the sealing portion is horizontally displaced from its lid attachment site.
Figure 22:
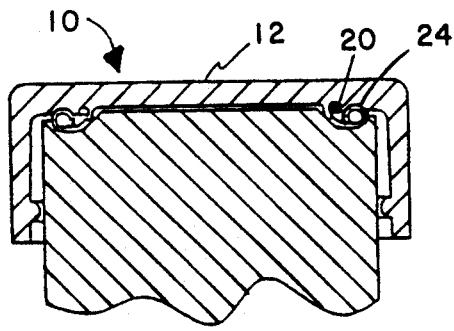
FIG. 22 is generally the same as FIG. 21 except that the curling tool has completed the formation of the horizontally displaced sealing portion.
Figure 23:
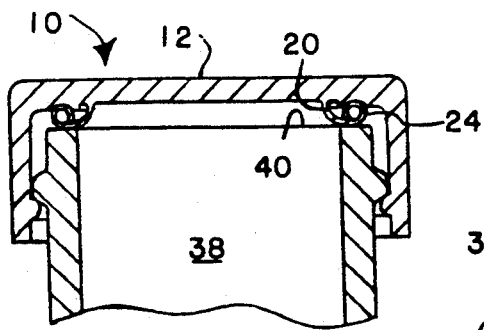
FIG. 23 is a longitudinal cross section showing the cap of FIG. 22 in sealing engagement with a container.

Referring now to FIGS. 21 to 23, there is shown another embodiment of the invention in which the curled free end 24 is horizontally displaced by a generally flat portion 48 from the attachment site of upper end 20 to the lid 12. In this manner the curled free end 24 is completely free to be compressed when used as a rim seal without the reinforcing influences of upper end 20 on its compressibility. FIG. 21 shows the cap 10 as molded, positioned above curling tool 27 prior to curling. The curling tool 27 has a groove 28 including a beveled portion 39, a flat portion 41a and a curved portion 41b. Under compression from tool 27, the cap free end 22 enters the groove 28 at the beveled, lead-in portion 39, travels outwardly along the flat groove portion 41a until it is curved upwardly by curved portion 41b whereupon it continues to curl upwardly and inwardly as a result of its plastic memory. Optionally the upward and inward curling can be facilitated by shaping the bottom of lid 12 to form a groove 11 to receive and help shape the free end 22. FIG. 23 shows the curled free end 24 in compressive sealing engagement with rim 40 of bottleneck 38 wherein the upper end 20 is displaced from the area of sealing engagement. Optionally the curled free end 24 may be located inwardly from the upper wall portion 20 employing suitable modifications of tool 27.

Figure 24:
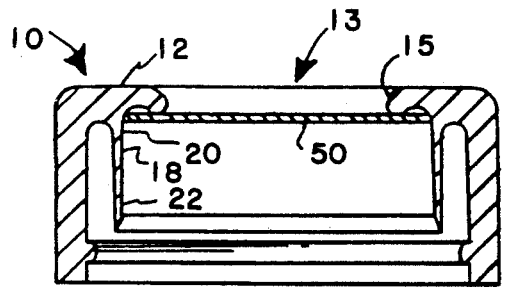
FIG. 24 is a longitudinal cross section of a cap including a separate lid portion prior to formation of an O-ring linerless seal including a sealing engagement with the separate lid portion.
Figure 25:
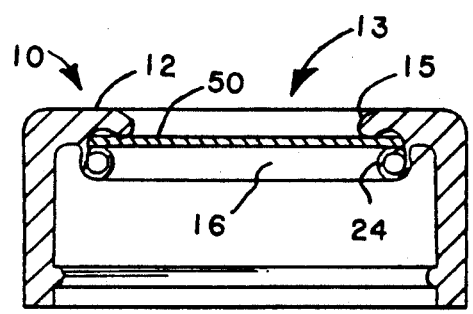
FIG. 25 is generally the same as FIG. 24 except that the O-ring linerless seal has been formed and is in sealing engagement with the separate lid portion.

Referring now to FIGS. 24 and 25 there is shown a threaded cap of the invention including a separate lid. FIG. 24 shows a cap 10, as molded, including a lid 12 having a a central opening 13 bounded by a depending wall 18 with an upper portion 20 and a free end 22. The central opening 13 is bounded at the lid 12 upper surface by an inward projection 15. Located in the opening 13 is a metal lid portion 50 which abuts the lid inward projection 15 and is bounded by upper wall portion 20. FIG. 25 shows the cap 10 with its metal lid portion 50 after the wall 18 has been curled by the method of the invention as shown in FIGS. 3 to 5 except that the curled portion 24 is inwardly directed so as to fixedly engage the metal lid portion 50 in a sealing engagement. The cap 10 is now ready for capping a container and the curled portion 24 of its linerless seal 16 performs a sealing engagement on both the container neck and the cap metal lid portion 50. Optionally the central lid portion 50 may be made of other materials such as plastic which offer transparency, barrier, cost or other advantages.

Figure 26:
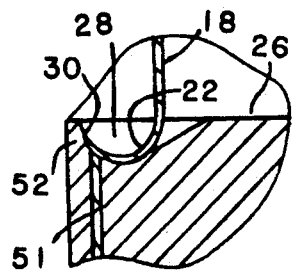
FIG. 26 is a longitudinal section view of a portion of a cap linerless seal preform in early engagement with a curling tool forming groove which has been modified to heat and melt the preform rim.
Figure 27:
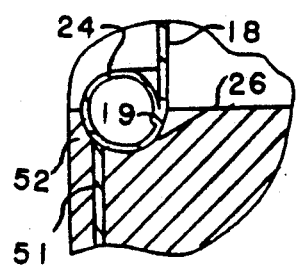
FIG. 27 is generally the same as FIG. 26 except that the tool curling engagement has been completed and the preform rim has fused and been welded to an upper portion of the preform wall.

Referring now to FIGS. 26 and 27 there is shown another embodiment of the invention wherein a hollow shaped ring is formed and welded to enclose a hollow space thereby creating an article having pneumatic qualities. FIG. 26 shows a wall 18 with its free end partially curled by a tool 26. The tool 26 includes an annular groove 28 a portion of which is bounded by an annular tool insert 52 for heating at a high temperature and an insulating portion 51 to allow the remainder of tool 26 to be operated at a lower temperature. The free end 22 has a rim 30 which has a reduced thickness which can be heated to a melting temperature more quickly than the remainder of free end 22. The heated tool insert 52 is heated to a temperature sufficiently above the melting point of the plastic to melt the rim 30 of reduced thickness but not high enough to melt the thicker succeeding portions of free 22 as it passes in contact with it during curling to form an O-shape 24 of free end 22. When the melted rim 30 completes its curling it contacts the wall 18 and forms a welded attachment 19 therewith as shown in FIG. 27. The resultant curled free end 24 is thereby prevented from any possibility of being uncurled as well as converted into a pneumatic shape. Optionally the curled free end 24 may be welded or otherwise bonded by other means after the O-shape cross section has been formed.

Figure 28:
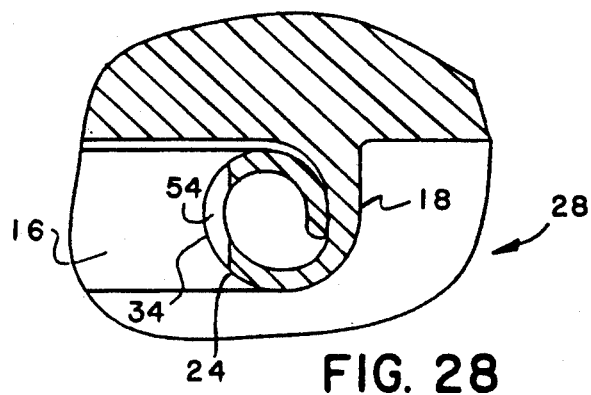
FIG. 28 is a longitudinal cross section of a portion of the linerless seal of the invention which has been modified to have a plurality or slits to increase its resiliency during compressive sealing engagement.
Figure 29:
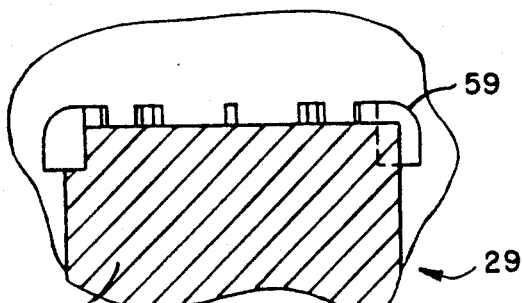
FIG. 29 is a longitudinal sectional view of the slitting tool.
Figure 30:
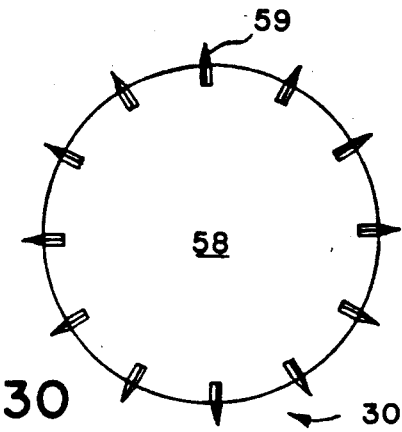
FIG. 30 is a plan view of the slitting tool of FIG. 29.
Figure 30A:
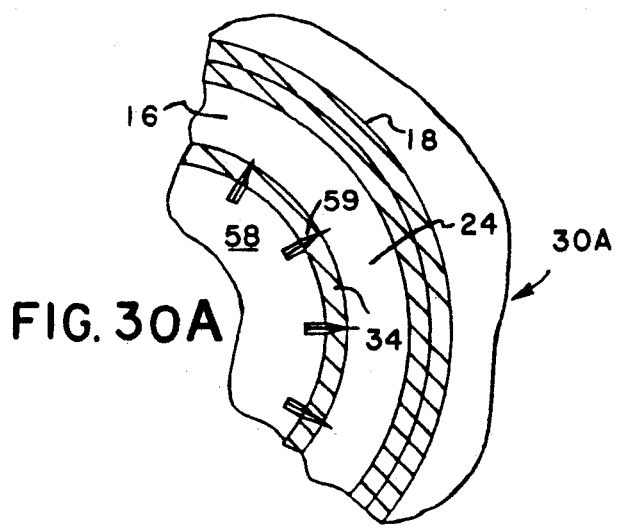
FIG. 30A is a cross sectional view of a portion of the curled seal of FIG. 28, schematically illustrating the slitting by the blades of the slitting tool of FIGS. 29 and 30.

Referring now to FIGS. 28 to 30A there is shown another embodiment wherein a non-sealing portion of the linerless seal 16 of the invention is slit radially to provide enhanced resilience during a compressive sealing engagement. FIG. 28 shows a cross section of an inwardly curled free end 24 showing a slit 54 on its inner portion 34. The slits serve the purpose of eliminating the hoop strength of inner portion 34 so that resistance to compression occurs primarily in the curl direction. FIGS. 29 and 30 show a slitting tool 58 with slitting elements 59 spaced radially about its upper periphery. To produce the slitted linerless seal 16, the curled free end 24 is first produced by the method described in FIGS. 3 to 5 and then the slitting tool 58 is brought into engagement with it to produce the slits (see FIG. 30A). Optionally the slitted curled free end may be produced having an outward orientation. Also the slits may be produced to extend to the lip 30 after curling or by slitting the wall 18 prior to curling.

Figure 31:
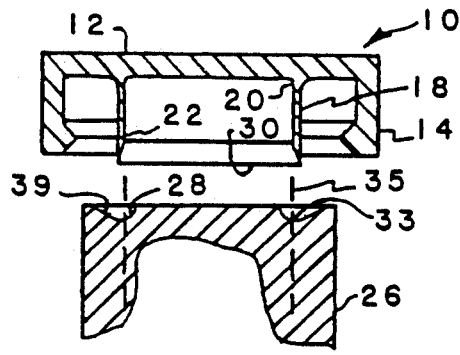
FIG. 31 is a longitudinal view of a snap cap with a preform for the linerless seal about to be engaged by a curling tool of the invention to produce an inward curl which provides an "O" ring linerless seal of the invention.
Figure 32:
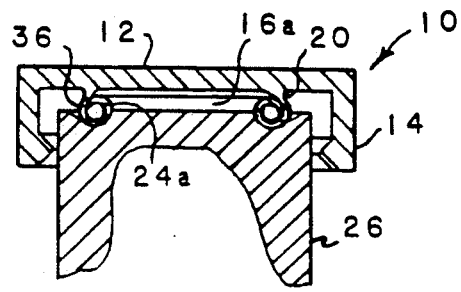
FIG. 32 generally is the same as FIG. 31, except that the inward curl of the linerless seal has been completed.
Figure 33:
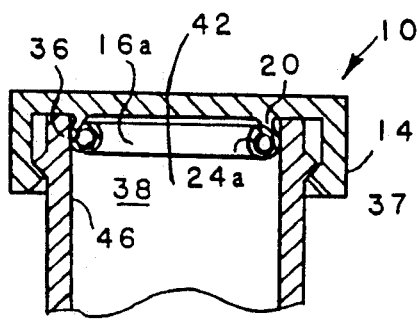
FIG. 33 is a longitudinal sectional view of the completely formed snap cap of FIG. 32 snapped on the neck finish of a bottle to close and seal the bottle.

Referring now to FIGS. 31 to 33, there is shown a snap cap 10 and an integral plug seal 16a wherein the curl 24a is formed by curling tool 26 inwardly and upwardly so that the outside sealing surface 36 is contiguous with the upper end and attachment site 20 of seal 16a. The inward direction of the curl 24a is achieved by locating the center of concavity 33 of the curling groove 28 inwardly of the cylindrical plane of wall 18 as illustrated by the dotted lines 35 of FIG. 31. In this embodiment to develop the maximum compressibility and adaptability of seal 16a to the neck wall 46, the plane of attachment site 20 must be displaced as much as possible from the plane of the neck wall 46. Therefore, it is necessary to develop the maximum curvature to the outside sealing surface 36 which is now contiguous to the attachment site 20. This is accomplished by locating the center of concavity 33 of groove 28 as close as possible to the plane of wall 18, which is facilitated by tapering the lower free end 30 of wall 18 away from the center of concavity 33 and by removing any restraints to the free outward displacement of surface 36 resulting from the stresses imposed during the curling operation by providing ample free space in the outward slanted portion 39 of groove 28. This results in lcoating the plane of sealing surface 36 further from the attachment site 20 as shown in FIG. 33. Preferably the radial cross section of the curled portion of seal 16a includes an arc or curved portion of from about 90 to about 450 degrees.

Figure 34:
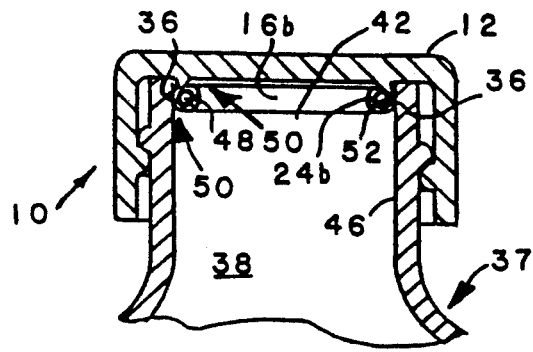
FIG. 34 is a longitudinal sectional view of a threaded cap and linerless seal of another embodiment of the invention in capping sealing engagement with a neck of a bottle, wherein the seal comprises an inward curl having an "O" ring shape.

In FIG. 34, there is shown a threaded cap 10 and integral plug seal 16b wherein the curl 24b has been formed by a curling tool 26 (not shown) inwardly and upwardly. As a result, the hollow interior 48 of the "O" ring is in communication with the interior of the partially shown container 37. In this manner internal pressure 50 (indicated by arrows) within container 37 is directed toward the inside surface 52 of side sealing portion 36 thereby using this pressure to reinforce the sealing engagement developed by the forced fit of the seal 16b within the wall 46 of the bore 42. Thus, the internal pressure 50 acting to separate the sealing portion 36 from the wall 46 at their interface is offset by the same pressure 50 acting to force the sealing portion 36 against the wall 46 of the bore 42. This embodiment of the invention has particular advantages for containers holding pressurized products.

Figure 35:
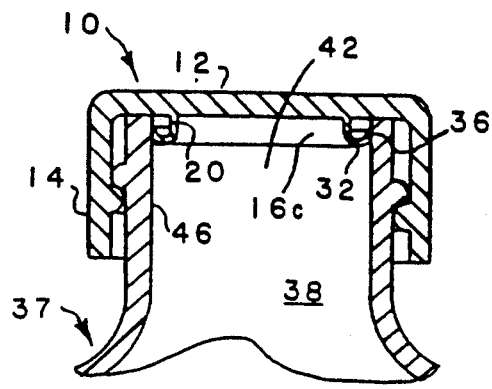
FIG. 35 is a longitudinal sectional view of another embodiment of the seal of the present invention, wherein the seal generally has a "J" or "U" shape and is used as a plug seal.

FIG. 35 illustrates an embodiment of the invention wherein the integral seal 16c has a "J" shaped curl which is formed as shown in FIG. 4. The seal 16c is used as a plug seal in sealing engagement with the wall 46 of the bore 42 of the bottle neck 38. The J shape seal 16c possesses the advantages of the present invention including the curled or curvilinear side sealing portion 36, a bottom curled portion 32, and substantial inward displacement of the attachment site 20 from the sealing surfaces between the curled side portion 36 and wall 46. In this embodiment the sealing stresses are distributed over the bottom portion 32 having a half round or semicircular cross section so that localized stress levels and plastic creep may be higher in comparison with the "O" ring embodiment of the invention, but still well within the desired improved performance of the invention. Preferably the radial cross section of the curled portion of the seal 16c includes an arc of about 90 to 180 degrees.

Figure 36:
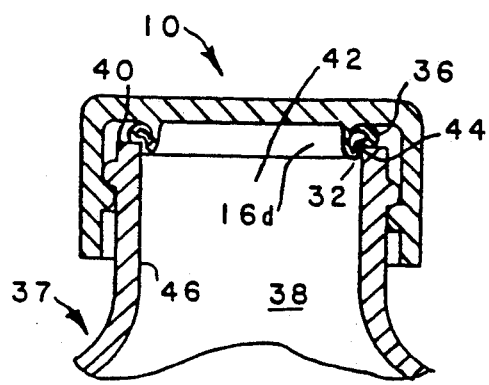
FIG. 36 is a longitudinal sectional view of a cap and linerless seal of still another embodiment of the present invention, wherein the "O" ring is used as an interior corner seal.

In FIG. 36 there is shown a "O" ring integral seal 16d which is similar to the seal 16 of FIGS. 5 to 7 but with a larger diameter so that when the cap 10 is applied to the bottle neck 38, the seal 16d will not seat itself completely within the bore 42 but will be compressed by the interior corner 44 of the neck rim 40 in such a way as to provide a sealing engagement at corner 44 and its adjacent surfaces on rim 40 and the wall 46 of the bore 42. Such a sealing engagement employs the high compressibility of the hollow "O" ring 24d advantageously to enhance the seal integrity of the seal 16d by providing large sealing areas on the rim 40 and wall 46 in addition to a high localized sealing pressure at the corner 44 while retaining much of the resilience contributed by its curvilinear cross section and freedom to float in the horizontal plane.

Figure 37:
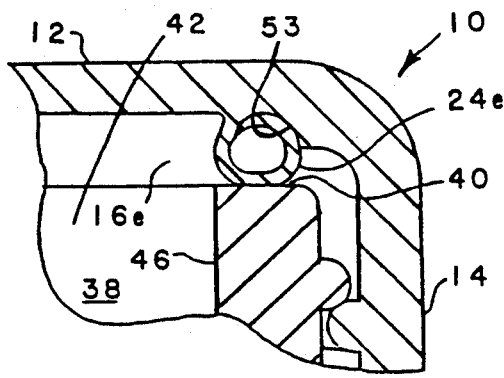
FIG. 37 is a longitudinal sectional view of a portion of a cap illustrating the sealing engagement between a linerless "O" ring seal of the present invention and the rim of the illustrated neck finish.

In FIG. 37 the "O" ring seal 16e is similar to seal 16 shown in FIGS. 5 and 7 and seal 16d shown in FIG. 36 except that its larger diameter in the horizontal plane positions it directly above bottle neck rim 40 where it is employed as a purely vertical compressive seal using the advantageous hollow "O" ring shape 24e. A recess 53 is provided in lid 12 above "O" ring 24e to closely conform to its convex exterior surface. As a result, the performance of seal 16e is similar to that of seal 16 except that its sealing engagement is with rim 40, it does not move in the horizontal plane and, where desired, sealing pressures can be increased to much higher levels depending on the level of torque applied during capping.

Figure 38:
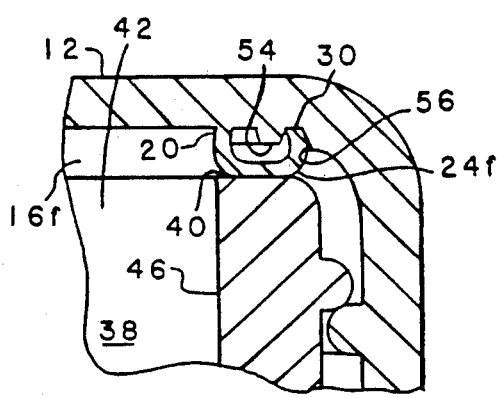
FIG. 38 is similar to FIG. 37, except that it illustrates the sealing engagement between a "U" shaped linerless seal of the present invention and the rim of the illustrated neck finish.

In FIG. 38 the seal 16f is formed into a semi-circular or U shape 24f. This shape is produced in the same manner as the "J" shape 16c as illustrated in FIG. 4 except that the vertical leg of wall 18 is eliminated. Bumpers 54 and 56 have been incorporated into the underside of lid 12 to fix the lip 30 into position and to restrain its movement during use. The performance of seal 16f compares to the "O" ring shape of seal 16e of FIG. 37 in most respects except that its smaller cross section yields a higher level of stress concentration and plastic creep, although well within the desired improved performance levels of the invention. Optionally, bumber 54 may be extended in height to provide further reinforcement to lower portion 32 of seal 16f and a positive stop to its compression during sealing engagement.

Figure 39:
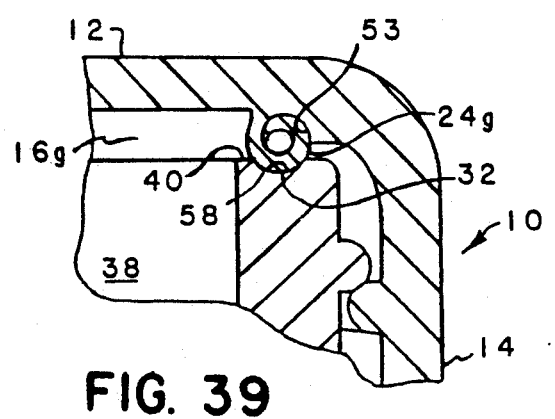
FIG. 39 is a longitudinal sectional view of a portion of the cap and linerless seal of another embodiment of the invention illustrating the use of a coiled ring as a rim seal.

FIG. 39 illustrates a linerless seal 16g having an "O" ring shape with a highly coiled cross section 24g which abuts a concave surface 53 located in lid 12. In sealing engagement the seal 16g also abuts a concave surface 58 located on the neck rim 40. The seal 16g is produced by more fully curling the "O" ring shape of seal 16e of FIG. 37. The concave surfaces 53 and 58 are dimensioned to conform to the curvature of the curl 24g of seal 16g so that when the cap 10 is torqued up during application to the neck 38, the seal 16g is restrained from thereby ovalizing and therefore more fully translates the compressive sealing stresses into the further coiling of feature 16g. As a result, the compressive sealing stresses are even more uniformly distributed than with seal 16e of FIG. 37 with resultant enhanced creep resistance and maintenance of seal integrity.

Figure 40:
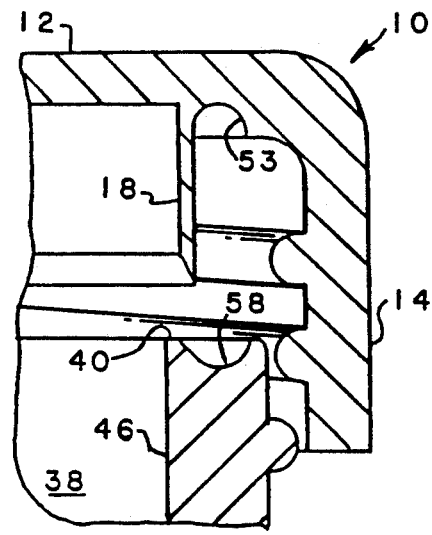
FIGS. 40 and 41 are longitudinal sectional views of a portion of the cap and neck finish, illustrating the post-forming of a linerless seal of the invention by the neck finish during the capping operation.
Figure 41:
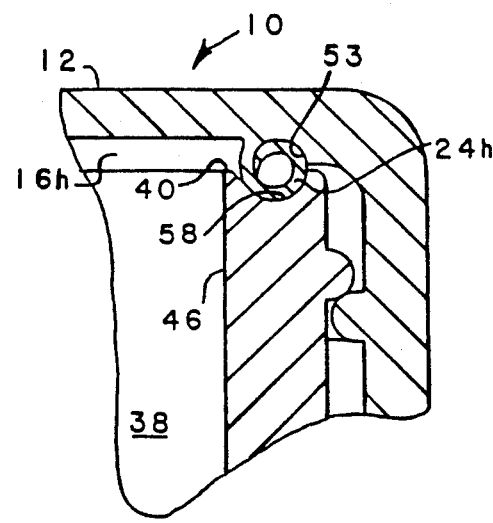

FIGS. 40 and 41 illustrate an embodiment of the invention wherein the bottle neck 38 of FIG. 39 with its concave surface 58 can be used to curl the as-molded preform cylindrical wall 18 of the cap 10 shown in FIG. 3. In FIG. 40 the wall 18 is as molded (preformed) with concave rim 58 of the bottle neck 38 ready to engage and curl the wall 18 as the cap 10 is applied. FIG. 41 shows the results of fully seating the cap 10 onto bottle neck 38 with the downward thrust of wall 18 into the concave surface 58 resulting in a seal 16h of the invention having an "O" ring shape 24h.

Figure 42:
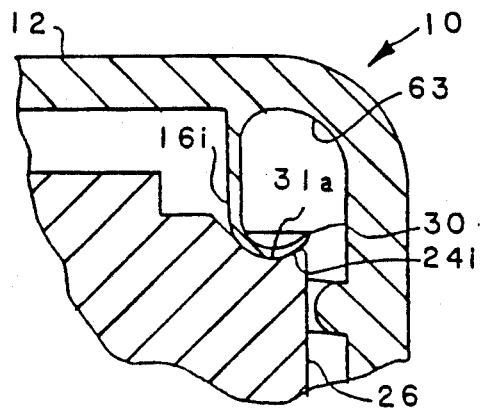
FIGS. 42 and 43 are longitudinal sectional views of a portion of the cap of the invention illustrating the post-forming of a corner seal by the illustrated curling tool.
Figure 43:
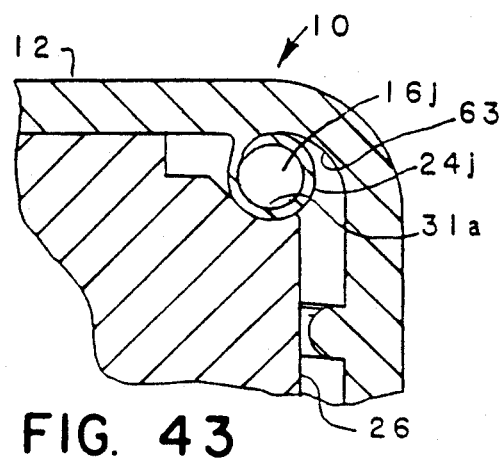
Figure 44:
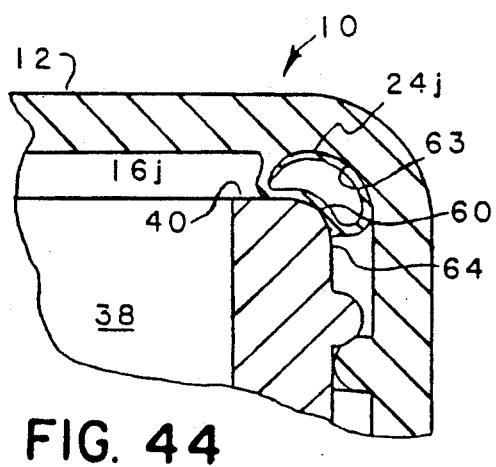
FIG. 44 is a longitudinal sectional view of the cap and formed corner seal of FIGS. 42 and 43 illustrating the sealing engagement of the seal with a corner of the illustrated neck finish.

FIGS. 42 to 44 illustrate the formation and sealing engagement of an "O" ring 24j of the invention on the underside of the cap lid 12 in such a way as to engage the exterior annular corner 60 of the neck rim 40.

In FIG. 42 the curling tool 26 includes an annular forming groove 31a located at its top outermost location with transitional seal 16i curled outwardly and slightly upwardly. As the end 30 of the transitional shape 24i leaves forming groove 31a, it is directed both outwardly and upwardly resulting in a completed "O" ring shape 24j which extends beyond the perimenter of curling tool 26 well into the interior corner 63 of cap 10, as shown in FIG. 43. In this location it will engage the exterior corner 60 and the contiguous rim 40 and depending surface 64 of bottle neck 38 in sealing engagement as shown in FIG. 44. The performance of the seal 16j compares in many ways to that of seal 16d of FIG. 36.

Figure 45:
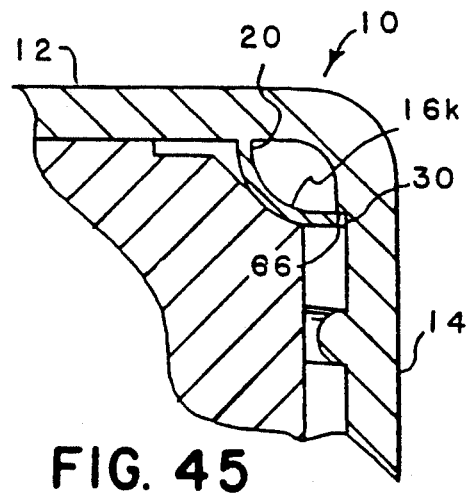
FIG. 45 is a longitudinal sectional view of a portion of a cap of the invention showing the formation of a linerless corner seal of the present invention where the seal has a quarter-round shape.
Figure 46:
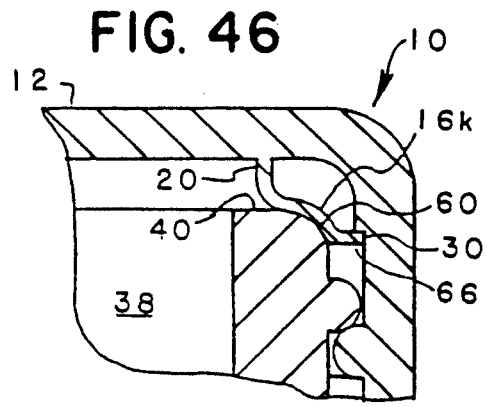
FIG. 46 is a longitudinal sectional view of the cap and formed quarter-round linerless seal of FIG. 45 in sealing engagement with the exterior corner of the illustrated neck finish.

FIGS. 45 and 46 illustrate the use of a quarter round curled seal 16k of the invention restrained at its free end to increase its sealing strength and to distribute its sealing stresses more uniformly.

FIG. 45 shows the quarter round seal 16k is curled to engage and be restrained by a shelf 66 in the interior wall of the cap skirt 14. As shown in FIG. 46, engagement by exterior or outer corner 60 of the neck rim 40 compresses the seal 16k. In doing so the sealing stresses are resisted by both the attachment site 20 and the engagement of rim 30 and shelf 66. As a result, the stresses are more uniformly distributed. Preferably the radial cross section of the curled portion of the seal 16k includes an arc of about 60 to 90 degrees.

Figure 47:
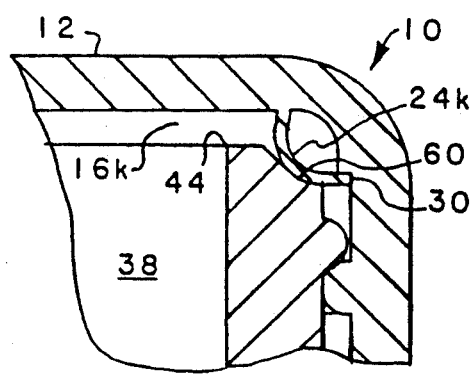
FIG. 47 is a longitudinal sectional view of a portion of the cap illustrating the postforming of the quarter-round linerless seal of FIG. 45 by the neck finish during the capping operation.

FIG. 47 illustrates how the bottle neck 38 can be used to postform the quarter round seal 16k of FIG. 45. In this embodiment the outer corner 60 of neck 38 has a beveled, slightly concave surface to engage end 30 of the preform wall 18 (not shown) during capping. FIG. 47 shows the results of fully seating the cap 10 onto bottle neck 38 with the downward thrust of wall 18 onto the beveled outer corner 60 resulting in a seal 16k of the invention having a quarter round shape 24k. Optionally, the inner corner 44 of the bottle neck 38 may be similarly beveled and shaped to engage and curl the preform wall 18 during capping to form a modified plug seal.

Figure 48:
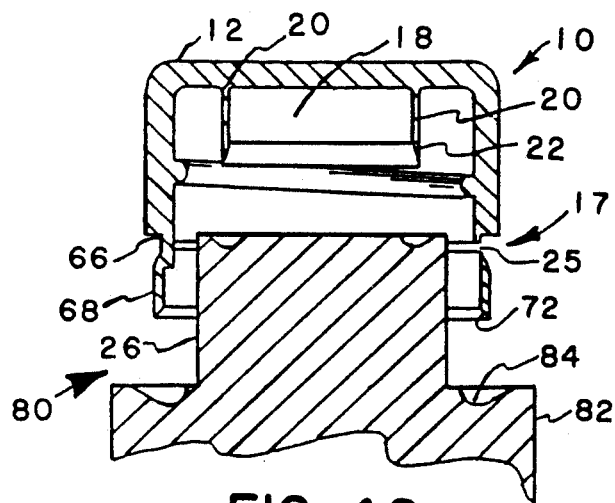
FIG. 48 is a longitudinal sectional view of another embodiment of the cap of the invention including a preform for a tamper evident ring and a linerless seal within the cap ready for engagement by a curling tool of the invention.
Figure 49:
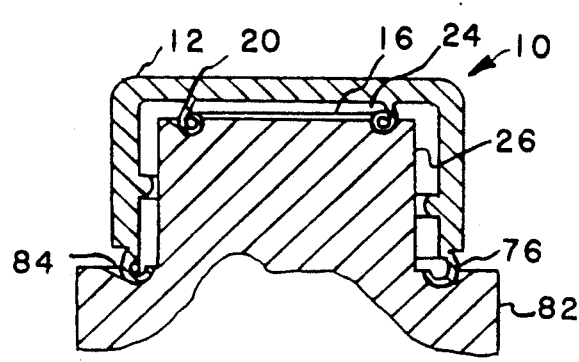
FIG. 49 is the same as FIG. 48, except that the curling tool has fully engaged the preform portions of the cap to form a linerless seal having an O-shape cross section and an inwardly curled tamper evident ring having a J-shape cross section.
Figure 50:
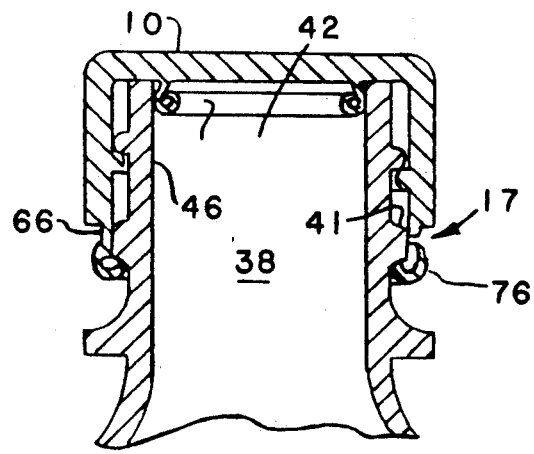
FIG. 50 is a longitudinal sectional view of the completely formed cap of FIG. 49 engaging, initially closing and sealing the illustrated bottle.

FIGS. 48 to 50 are illustrative of how the curling operation of the invention can be combined with the curling operation of my copending application U.S. Pat. No. 4,709,824 to concurrently form the linerless seal of the present invention and the breakaway ring of the invention of my copending application.

As shown in FIG. 48, the cap 10 is molded with a line of weakness 17 including bridges 66 and a depending tubular band 68 as well as with the preforms annular wall 18 depending from the lid 12 for an internal integral or linerless seal 16. The wall 18 includes an upper end 20 integral with the lid 12 and a depending free end 22.

In the illustrative embodiment, the curling tool 80 has an upper portion 26 with an annular groove 28 for forming an inward curl in the free end 22 and a lower portion 82 having an annular groove 84 for forming an inward curl in the free end 72. As illustrated, the tool upper portion 26 is positioned within the annular groove 84, extends upwardly, and has a diameter which is less than the diameter of the cap 10 so that it can extend thereinto to form the linerless seal 16.

In FIG. 48 the tool 80 is positioned below and within the cap 10 ready to engage simultaneously the outer and inner tubular walls 68 and 18. FIG. 49 shows the curling tool 80 fully engaged with cap 10 having completed the formation of an "O" ring curl 24 to produce linerless seal 16 and a breakaway ring 76. In this embodiment the wall 68 is curled to a lesser extent than for the "O" ring curl 24 of the linerless seal 16 by stopping the curling compression at the appropriate stage. This results in a "J" shape for the ring 76 which engages locking ring 41 of bottle neck 38 as shown by FIG. 50. At the same time the linerless "O" ring seal 16 is a plug seal which engages and seals against the wall 46 of the bottle opening 42 in the neck 38 thereof.

The invention in its broader aspects is not limited to the specific described embodiments and departures may be made therefrom within the scope of the accompanying claims without departing from the principles of the invention and without sacrificing its chief advantages.

I claim:

1. A cap for a container, comprising:

a top wall and a wall depending from said top wall within the cap comprising plastic and having a stretched, sealing surface which is softer than contiguous unstretched portions and which upon engagement with a container is adapted to compress and seal.

2. A cap as defined in claim 1, wherein said sealing surface is stretched into cross-sectional shape selected from the group consisting of a coil, O, U, J, or quarter round.

3. A cap as defined in claim 1 wherein said sealing surface is stretched so that its soft sealing surface is in a state of tension.

4. A cap as defined in claim 1 wherein said plastic is selected from a group consisting of polymers which when stretched produce microscopic voids that soften and make plastic more compressible, and said plastic being prestretched to provided a pre-stretched, pre-softened linerless sealing surface which includes microscopic pores.

5. A cap as defined in claim 1 wherein said top wall of the cap includes a groove laterally spaced from the depending wall at the top wall for receiving the sealing surface.

6. A cap as defined in claim 1 wherein said sealing surface curled inwardly.

7. A cap as defined in claim 1 wherein said sealing surface is curled outwardly.

8. A cap as defined in claim 1 which is a twist cap.

9. A cap as defined in claim 1 which is a snap cap.

10. A cap as defined in claim 2 wherein said sealing surface is a plug seal, a top seal or a corner seal.

11. The cap of claim 1 in combination with a container.

12. A combination as defined in claim 11 wherein said container is glass.

13. A combination as defined in claim 11 wherein said container is plastic.

14. A plastic seal for a container, comprising a pre-stretched and pre-softened linerless sealing surface which includes microscopic voids and which is adapted to compress and seal upon engagement.

15. A seal as defined in claim 14 wherein said sealing surface is stretched into a cross-sectional shape selected from the group consisting of a coil, O, U, J, or quarter round.

16. A seal as defined in claim 14 wherein said sealing surface is in a state of tension.

17. A linerless cap for a container, comprising:
a top wall, and
a depending wall within the cap integral with and extending from said top wall to a free end, wherein said free end is curled into a compressible and resilient, pre-stretched, pre-softened, linerless sealing surface and wherein said depending wall adjacent said seal is angularly sloped and laterally displaces said seal from the point the depending wall depends from the top wall.

18. A cap as defined in claim 17, wherein said top wall includes a groove for receiving said curled seal.

19. A cap as defined in claim 17 wherein said end is curled into a cross-sectional shape selected from the group consisting of a coil, O, U, J, or quarter round.

20. A cap as defined in claim 17 wherein said end is stretched so that its soft sealing surface is in a state of tension.

21. A cap defined in claim 17 wherein said sealing surface is curled inwardly.

22. A cap as defined in claim 17 wherein said sealing surface is curled outwardly.

23. A cap as defined in claim 17 wherein said sealing surface is a plug seal, a top seal or a corner seal.

24. The cap of claim 17 in combination with a container.

25. A combination as defined in claim 24 wherein said container is glass.

26. A combination as defined in claim 24 wherein said container is plastic.

27. A cap for a container, comprising:
a top wall with a central opening therein
a lid below said opening, and
a depending wall adjacent said opening integral with and extending from said top wall to a free end of plastic curled into holding and sealing engagement with said lid.

28. A cap as defined in claim 27 wherein said end is curled into a cross-sectional shape selected from the group consisting of a coil, O, U, J, or quarter round.

29. A cap as defined in claim 27 wherein said end is stretched so that its soft sealing surfaces is in a state of tension.

30. A cap as defined in claim 27 wherein said depending wall is a plastic selected from a group consisting of polymers which when stretched produce microscopic voids that soften and make plastic more compressible, and said plastic increases stretching to provide a pre-stretched, pre-softened linerless sealing surface which includes microscopic pores.

31. A cap as defined in claim 27 wherein said curled free end of said wall also is a compressible and resilient seal adapted to be engaged for sealing.

32. A cap as defined in claim 31 wherein said is curled inwardly.

33. A cap as defined in claim 31 wherein said is curled outwardly.

34. A cap as defined in claim 31 wherein said sealing surface is a plug seal, a top seal or a corner seal.

35. The cap of claim 27 in combination with a container.

36. A combination as defined in claim 35 wherein said container is glass.

37. A combination as defined in claim 35 wherein said container is plastic.

38. A linerless cap for a container comprising:
a top wall, and
a depending wall within the cap comprising plastic and having an end integral with and extending from said top wall, and a lower curled free end extending away from said depending wall having a cross-sectional shape of an O ring terminating in a rim in contact with and welded to said depending wall and which is a pre-stretched, pre-softened, linerless sealing surface.

39. A cap as defined in claim 38 wherein said end is stretched so that its soft sealing surface is in a state of tension.

40. A cap as defined in claim 38 wherein said depending wall is a plastic selected from a group consisting of polymers which when stretched produce microscopic voids that soften and make the plastic more compressible, and said plastic being pre-stretched to provide a pre-stretched, pre-softened linerless sealing surface which includes microscopic pores.

41. A cap as defined in claim 38 wherein said sealing surface is curled inwardly.

42. A cap as defined in claim 38 wherein said sealing is surface curled outwardly.

43. A cap as defined in claim 38 wherein said sealing surface is a plug seal, a rim seal or a corner seal.

44. The cap of claim 38 in combination with a container.

45. A combination as defined in claim 44 wherein said container is glass.

46. A combination as defined in claim 44 wherein said container is plastic.

47. A linerless cap for a container, comprising:
a top wall, and
a seal within the cap including a depending wall having an end integral with and extending from said top wall to a lower curled free end comprising plastic and extending away from said wall to provide a curved sealing portion prior to engagement and which upon engagement is adapted to compress and seal, said curled free end including slits in the non sealing portion of said curled free end.

48. A cap as defined in claim 47 wherein said seal is stretched into cross-sectional shape selected from the group consisting of a coil, O, U, J, or quarter round.

49. A cap as defined in claim 47 wherein said seal is in a state of tension.

50. A cap as defined in claim 47 wherein said plastic is pre-stretched and pre-softened to provide a linerless sealing surface.

51. A cap as defined in claim 47 wherein said end is curled into cross-sectional shape selected from the group consisting of a coil, O, U, J, or quarter round.

52. A cap as defined in claim 47 wherein said end is stretched so that its soft sealing surface is in a state of tension.

53. A cap as defined in claim 47 wherein said depending wall is a plastic selected from a group consisting of polymers which when stretched produce microscopic voids that soften and make plastic more compressible, and said plastic being pre-stretched to provide a pre-stretched, pre-softened linerless sealing surface which includes microscopic pores.

54. A cap defined in claim 47 wherein said seal is a plug seal, a rim seal or a corner seal.

55. The cap of claim 47 in combination with a container.

56. A combination as defined in claim 55 wherein said container is glass.

57. A combination as defined in claim 55 wherein said container is plastic.

58. A linerless tamper evident cap, comprising:
a top wall,
an outer depending skirt with a line of weakness and a curled free end of plastic for interfering engagement with a container upon capping so that upon initial removal of the cap the line of weakness separates to indicate the condition of the container, and
an inner depending wall integral with and extending from said top wall to a curled resilient and compressible plastic free end adapted to be engaged by the container for sealing upon capping and closing.

59. A cap as defined in claim 58 wherein said end is stretched into a cross-sectional shape selected from the group consisting of a coil, O, U, J, or quarter round.

60. A cap as defined in claim 58 wherein said inner depending wall free end is in a state of tension.

61. A seal as defined in claim 58 wherein said plastic of said inner depending wall free end is pre-stretched and pre-softened to provide a linerless sealing surface.

62. A cap as defined in claim 58 wherein said inner depending wall is a plastic selected from a group consisting of polymers which when stretched produce microscopic voids that soften and make the plastic more compressible, and said plastic being pre-stretched to provide a pre-stretched, pre-softened linerless sealing surface which includes microscopic pores.

* * * * *